(12) United States Patent
Maeda et al.

(10) Patent No.: US 10,691,043 B2
(45) Date of Patent: Jun. 23, 2020

(54) SUPPORTING UNIT, DEVELOPER CONTAINER, DEVELOPING DEVICE, PHOTOSENSITIVE MEMBER UNIT, PROCESS CARTRIDGE AND MANUFACTURING METHOD OF THE SUPPORTING UNIT

(71) Applicant: CANON KABUSHIKI KAISHA, Tokyo (JP)

(72) Inventors: Naoki Maeda, Suntou-gun (JP); Tetsuya Numata, Suntou-gun (JP); Makoto Hayashida, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/371,325

(22) Filed: Apr. 1, 2019

(65) Prior Publication Data

US 2019/0310567 A1  Oct. 10, 2019

(30) Foreign Application Priority Data

Apr. 5, 2018 (JP) ................. 2018-072822

(51) Int. Cl.
*G03G 15/08* (2006.01)
*G03G 21/18* (2006.01)
*B29C 65/08* (2006.01)

(52) U.S. Cl.
CPC ........... *G03G 15/087* (2013.01); *B29C 65/08* (2013.01); *G03G 15/0896* (2013.01); *G03G 21/1821* (2013.01)

(58) Field of Classification Search
CPC ............ G03G 15/087; G03G 21/1821; G03G 15/0896; B29C 65/08
See application file for complete search history.

(56) References Cited

U.S. PATENT DOCUMENTS

| 6,868,243 | B2 | 3/2005 | Watanabe et al. |
| 8,768,211 | B2 | 7/2014 | Hayashi et al. |
| 9,026,001 | B2 | 5/2015 | Numata et al. |
| 9,618,873 | B2 | 4/2017 | Murakami et al. |
| 9,823,603 | B2 | 11/2017 | Murakami et al. |
| 9,904,208 | B2 | 2/2018 | Maeda et al. |
| 10,073,380 | B2 | 9/2018 | Nosho et al. |
| 2011/0013929 | A1* | 1/2011 | Kim .................. G03G 15/0896 399/103 |
| 2019/0196358 | A1* | 6/2019 | Numata ............... G03G 15/087 |

FOREIGN PATENT DOCUMENTS

| JP | 2003-241622 A | 8/2003 |
| JP | 2005-049762 A | 2/2005 |

* cited by examiner

*Primary Examiner* — G. M. A Hyder
(74) *Attorney, Agent, or Firm* — Venable LLP

(57) ABSTRACT

A supporting unit for supporting a rotatable member to feed a developer includes a frame including a first surface extending in a direction crossing an axis of the rotatable member and a second surface extending in a direction crossing the first surface, and a fixed member. The fixed member includes (i) a first opposing surface opposing and contacting the first surface, (ii) a second opposing surface opposing the second surface, and (iii) a first front side surface opposite from the second opposing surface. The second opposing surface is welded to the second surface by ultrasonic spot welding such that a first recess is formed on the first front side surface.

17 Claims, 18 Drawing Sheets

SUPPORTING UNIT, DEVELOPER CONTAINER, DEVELOPING DEVICE, PHOTOSENSITIVE MEMBER UNIT, PROCESS CARTRIDGE AND MANUFACTURING METHOD OF THE SUPPORTING UNIT

FIELD OF THE INVENTION AND RELATED ART

The present invention relates to a supporting unit, a developer container, a developing device, a photosensitive member unit, a process cartridge and a manufacturing method of the supporting unit. Here, supporting unit is used for supporting a rotatable member for feeding a developer. The developer container is a container for accommodating the developer. The process cartridge is prepared by integrally assembling a photosensitive drum and a process means actable on the photosensitive drum into a cartridge (unit) and is mounted in an image forming apparatus main assembly so as to be mountable in and dismountable from the image forming apparatus main assembly.

According to this process cartridge type, maintenance of the image forming apparatus can be made by a user himself (herself), and therefore operativity can be remarkably improved, so that it is possible to provide an image forming apparatus excellent in usability. The photosensitive drum and a developing roller as a developer carrying member are supported rotatably by bearing members fixed to both end portions of a frame, and the bearing members are connected to the frame with screws in general. Japanese Laid-Open Patent Application (JP-A) 2005-49762 discloses that connection of the bearing members to the frame was performed by ultrasonic spot welding in place of the screws. Cost reduction is realized by disuse of the screws used for connecting the bearing members to the frame.

In JP-A 2005-49762, each of the bearing members was provided with a recessed portion for permitting insertion of a horn for the ultrasonic spot welding. In JP 2005-49762, the horn was moved in an axial direction of the photosensitive drum and was inserted into the recessed portion of the bearing member. Accordingly, on a surface extending in a direction crossing the axial direction of the photosensitive drum, there was a need to ensure a place which is to be occupied by the recessed portion is provided.

SUMMARY OF THE INVENTION

The present invention has solved the problem. A principal object of the present invention is to provide a supporting unit, for supporting a rotatable member, capable of preventing upsizing thereof with respect to a direction crossing an axial direction of the rotatable member in a constitution in which a frame and a fixed member welded to the frame by ultrasonic spot welding are provided.

According to an aspect of the present invention, there is provided a supporting unit for supporting a rotatable member configured to feed a developer, the supporting unit comprising: a frame including a first surface extending in a direction crossing an axis of the rotatable member and a second surface extending in a direction crossing the first surface; and a fixed member including a first opposing surface opposing and contacting the first surface and including a second opposing surface opposing the second surface and welded to the second surface by ultrasonic spot welding.

Further features of the present invention will become apparent from the following description of exemplary embodiments with reference to the attached drawings.

DESCRIPTION OF EMBODIMENTS

Embodiments of a supporting unit, a developer container, a developing device, a photosensitive member unit, a process cartridge and a manufacturing method of the supporting unit which are according to the present invention will be described with reference to the drawings.

First Embodiment

First, structures of the supporting unit, the developer container, the developing device, the photosensitive member unit, the process cartridge and the manufacturing method of the supporting unit which are according to the present invention in the First Embodiment will be described using FIGS. 1 to 15.

<Image Forming Apparatus>

Figure 1:
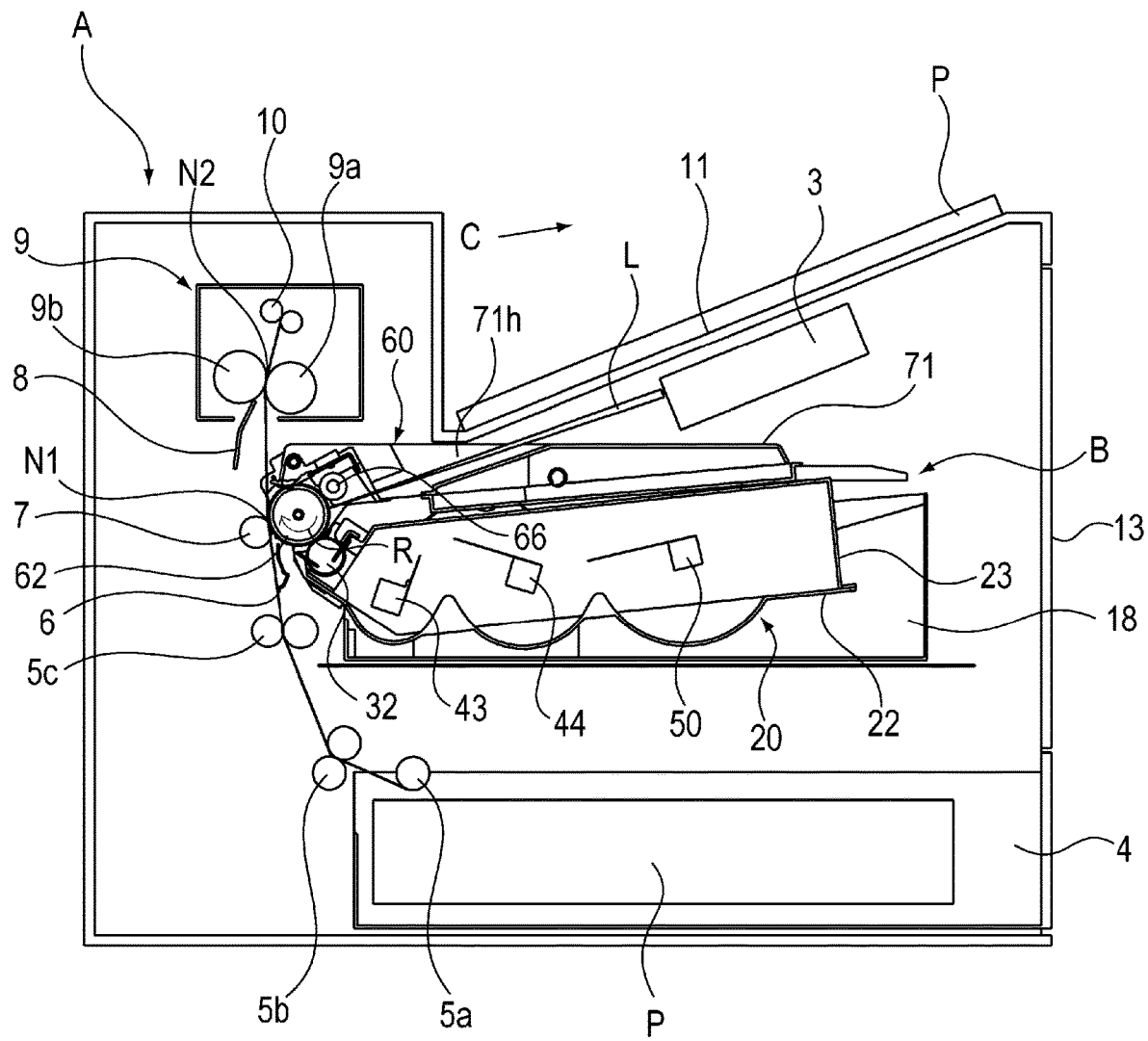
FIG. 1 is a sectional view showing a structure of an image forming apparatus in which a process cartridge including a supporting unit according to the present invention is mounted.
Figure 2:
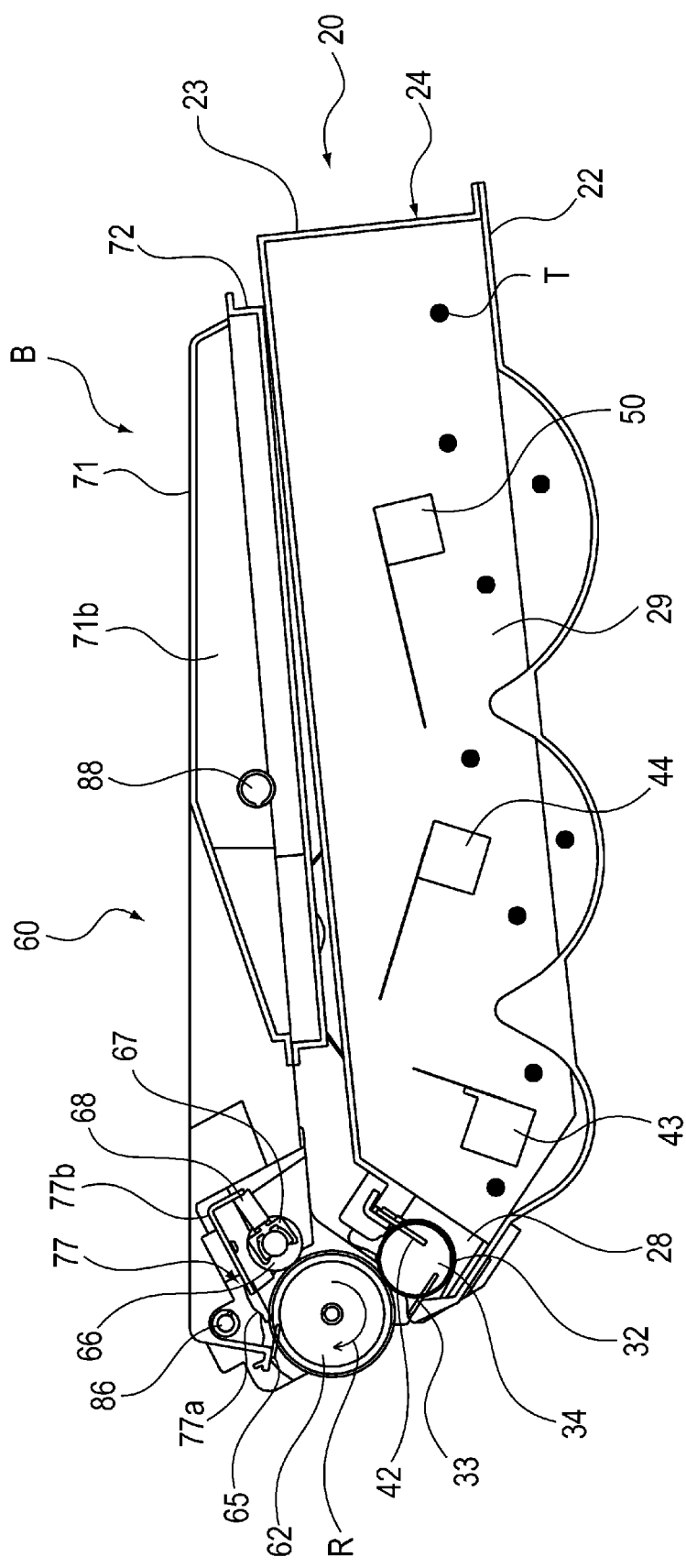
FIG. 2 is a sectional view showing a structure of the process cartridge including the supporting unit according to the present invention in a First Embodiment.

Using FIGS. 1 and 2, a structure of an image forming apparatus A in which a process cartridge B including the sectional view according to the present invention is mounted so as to be mountable in and dismountable from the image forming apparatus A. FIG. 1 is a sectional view showing the structure of the image forming apparatus A in which the process cartridge B including the supporting unit according to the present invention is mounted. FIG. 2 is a sectional view showing a structure of the process cartridge B including the supporting unit according to the present invention.

The image forming apparatus A shown in FIG. 1 is an example of a laser beam printer for forming an image on a recording material P by using an electrophotographic image forming type. In the following description, a rotational axis direction of a photosensitive drum 62 as an image bearing member which is provided in the process cartridge B and which bear a toner image (developer image) is a longitudinal direction, and a direction perpendicular to the rotational axis direction of the photosensitive drum 62 is a widthwise direction.

Further, with respect to the rotational axis direction (longitudinal direction) of the photosensitive drum 62, a side in which the photosensitive drum 62 receives a rotational driving force from a driving portion provided on a main assembly side of the image forming apparatus A is a driving side, and an opposite side thereof is a non-driving side. Here, the main assembly of the image forming apparatus A is a portion where the process cartridge B is removed from the image forming apparatus A.

The image forming apparatus A shown in FIG. 1 includes the process cartridge B shown in FIG. 2, and the process cartridge B is configured to be mountable in and dismountable from the main assembly of the image forming apparatus A. As shown in FIG. 1, on the main assembly side of the image forming apparatus A, a laser scanner unit which is an exposure means is provided. As shown in FIG. 1, the process cartridge B is mounted at an image forming position of the main assembly of the image forming apparatus A. In that state, the photosensitive drum 62 provided in the process cartridge B is rotated in an arrow R direction of FIG. 1. A surface of the photosensitive drum 62 is electrically charged uniformly by a charging roller 66 which is a charging means.

The uniformly charged surface of the photosensitive drum 62 is irradiated with laser light L emitted from the laser scanner unit 3 depending on image information. As a result, an electrostatic latent image depending on the image information is formed on the surface of the photosensitive drum 62. In a developing unit 20 which is a developing device provided in the process cartridge B, a developing roller 32 which is a developer carrying member for carrying toner T (developer) is provided. To the electrostatic latent image formed on the surface of the photosensitive drum 62, the toner T (developer) carried on the surface of the developing roller 32 is supplied. As a result, the electrostatic latent image formed on the surface of the photosensitive drum 62 is developed as a toner image. The developing roller 32 (developer carrying member) for supplying the toner T (developer) to the photosensitive drum 62 (image bearing member) is a rotatable member and is supported rotatably by a container main body 23 (developing roller) constituting the supporting unit.

On the main assembly side of the image forming apparatus A, a feeding tray 4 accommodating the recording material P is provided on a lower side of the process cartridge B mounted in the main assembly. Further, on the main assembly side of the image forming apparatus A, along a feeding direction C of the recording material P from the feeding tray 4, in the order from an upstream side, a pick-up roller 5a, a feeding roller pair 5b and a registration roller pair 5c are provided. Downstream of the registration roller pair 5c, a transfer guide 6 is provided. A transfer roller 7 which is a transfer means is provided opposed to the photosensitive drum 62. A transfer position N1 is formed by the surface of the photosensitive drum 62 and a surface of the transfer roller 7.

Downstream of the transfer position N1, a fixing device 9 which is a fixing means is provided. The recording material P passed through the transfer position N1 is introduced into the fixing device 9 by being guided by a feeding guide 8. In the fixing device 9, a heating roller 9a and a pressing roller 9b are provided. A fixing nip N2 is formed by the heating roller 9a and the pressing roller 9b. Downstream of the fixing nip N2, a discharging roller pair 10 is provided. Downstream of the discharging roller pair 10, a discharge tray 11 is provided.

<Image Forming Apparatus>

Next, an image forming operation of the image forming apparatus A will be described. As shown in FIG. 1, the process cartridge B is mounted at an image forming position of the main assembly of the image forming apparatus A. In that state, on the basis of a print start signal sent from an external device such as a personal computer, a rotational driving force is transmitted from a driving portion, provided on the main assembly side of the image forming apparatus A, to the photosensitive drum 62.

Then, the photosensitive drum 62 is rotationally driven at a predetermined peripheral speed (process speed) in the arrow R direction in FIG. 1. The charging roller 66 to which a charging bias voltage is applied from an unshown charging bias voltage source contacts the surface of the photosensitive drum 62 and electrically charges the surface of the photosensitive drum 62 uniformly.

The laser scanner unit 3 outputs the laser light L depending on the image information. The laser light L passes through an opening 71h provided in a cleaning frame 71 of the process cartridge B, so that the uniformly charged surface of the photosensitive drum 62 is subjected to scanning exposure. As a result, on the surface of the photosensitive drum 62, the electrostatic latent image depending on the image information is formed.

As shown in FIG. 2, the process cartridge B includes the developing unit 20 which is a developing means. In a stirring chamber 29 provided in the developing unit 20, the toner T is accommodated. In the stirring chamber 29, stirring members 43, 44 and 50 are provided. The stirring members 43, 44 and 50 are rotated in the clockwise direction in FIG. 2, whereby the toner T in the stirring is fed in a leftward direction of FIG. 2 while being successively stirred by the stirring members 43, 44 and 50, and is sent into a developing chamber 28 in which the developing roller 32 is provided.

The toner T supplied in the developing chamber 28 is carried by a magnetic force of a magnet roller 34, comprising a fixed magnet provided inside the developing roller 32, on a surface of a developing roller 32. The toner T carried on the surface of the developing roller 32 is regulated in layer thickness on the peripheral surface of the developing roller 32 by a developing blade 42 as a developer regulating member while being triboelectrically charged. The toner T carried on the surface is supplied to the electrostatic latent image formed on the surface of the photosensitive drum 62. As a result, the electrostatic latent image formed on the surface of the photosensitive drum 62 is developed and visualized as a toner image.

On the other hand, in synchronism with output timing of the laser light L, the pick-up roller 5a shown in FIG. 1 is rotated in the clockwise direction of FIG. 1, so that the recording material P accommodated in the feeding tray 4 is fed. Thereafter, the recording material P is nipped and fed by the feeding roller pair 5b, so that a leading end portion of the recording material P is abutted against a nip of the registration roller pair 5c which is at rest, and thus oblique movement of the recording material P is corrected.

Thereafter, at predetermined timing, the registration roller pair 5c is rotated. As a result, the recording material P is nipped by the registration roller pair 5c and then is fed toward the transfer position N1 by the registration roller pair 5c.

Then, the recording material P is fed to the transfer position N1 between the photosensitive drum 62 and the transfer roller 7 via the transfer guide 6. In this transfer position N1, the toner image formed on the photosensitive drum 62 is transferred onto the recording material P under application of a transfer bias from an unshown transfer bias voltage source to the transfer roller 7.

The recording material P on which the toner image is transferred is separated from the surface of the photosensitive drum 62 and then is fed to the fixing device 9 along the feeding guide 8. Then, the recording material P passes through the fixing nip N2 between the heating roller 9a and the pressing roller 9b which are provided in the fixing device 9. At this fixing nip N2, the recording material P is heated and pressed, so that the toner image is heat-fixed on the sheet material P.

The recording material P on which the toner image is heat-fixed is nipped and fed by the discharging roller pair 10 and then is discharged onto the discharge tray 11 provided at an outside portion of the image forming apparatus A. Residual toner remaining on the surface of the photosensitive drum 62 after the transfer is removed by a cleaning member 77, and is used again in the image forming operation. The residual toner removed from the surface of the photosensitive drum 62 is collected in a residual (waste) toner chamber 71b provided in a cleaning unit 60. Image forming process means actable on the photosensitive drum 62 is constituted by the charging roller 66, the developing roller 32, the transfer blade 7 and the cleaning member 77 and the like shown in FIGS. 1 and 2.

The cleaning unit 60 is a photosensitive member unit for rotatably supporting the photosensitive drum 62 as an image bearing member for bearing the electrostatic latent image. The photosensitive drum 62 is a rotatable member for feeding the toner T (developer).

<Mounting and Dismounting Operation of Process Cartridge>

Figure 3:
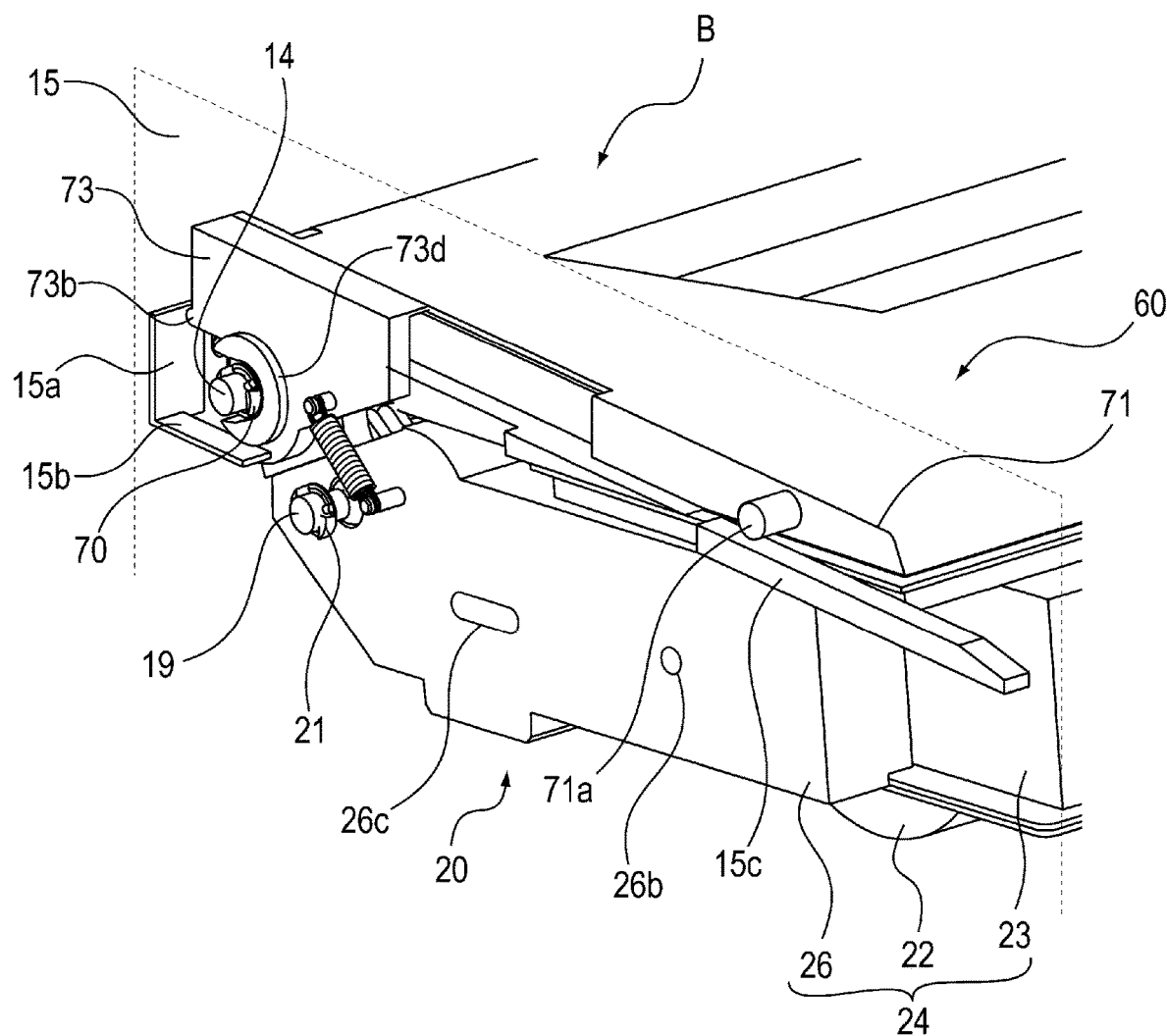
FIG. 3 is a perspective view showing a positioning portion between the process cartridge and an image forming apparatus main assembly on a driving side in a state in which the process cartridge in the First Embodiment is mounted in the image forming apparatus main assembly.
Figure 4:
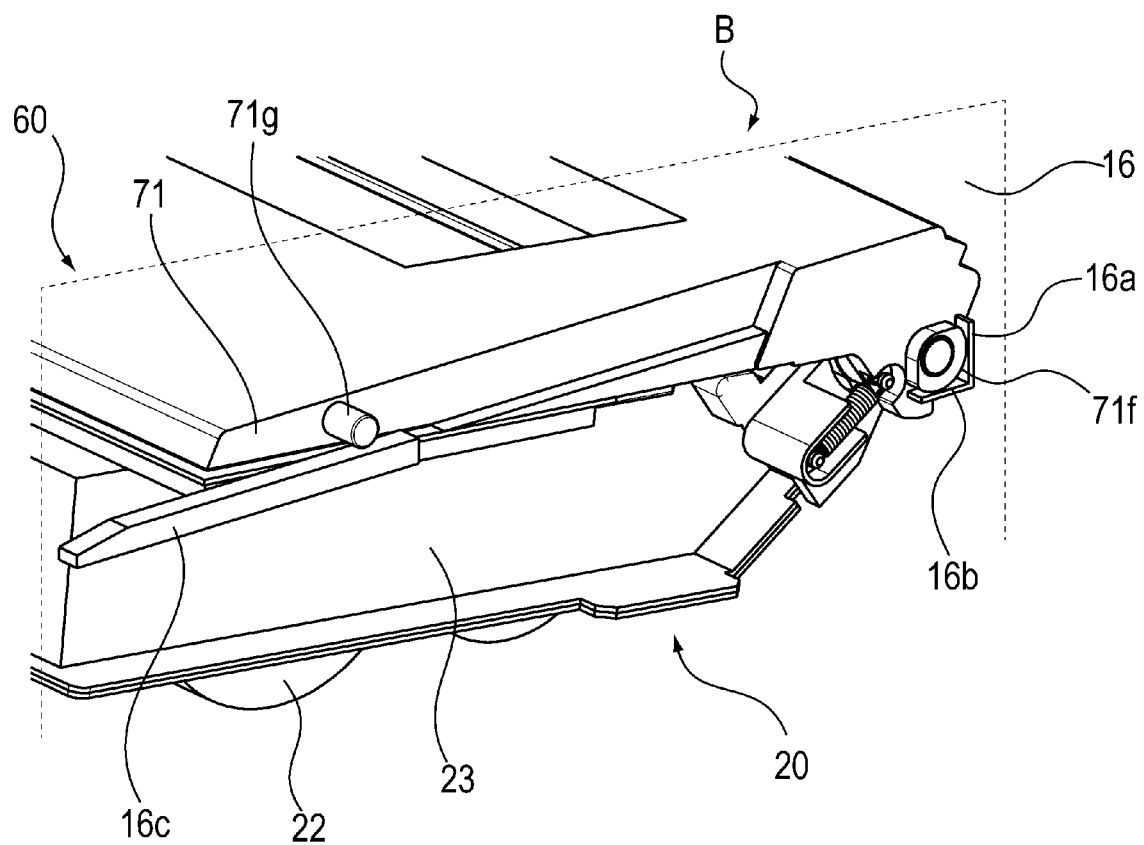
FIG. 4 is a perspective view showing a positioning portion between the process cartridge and the image forming apparatus main assembly on a non-driving side in the state in which the process cartridge in the First Embodiment is mounted in the image forming apparatus main assembly.

Next, using FIGS. 3 and 4, a mounting and dismounting operation of the process cartridge B relative to the main assembly of the image forming apparatus A will be described. FIG. 3 is a perspective view showing a positioning portion between the process cartridge B and the main assembly of the image forming apparatus arrow on a driving side in a state in which the process cartridge B in this embodiment is mounted in the main assembly of the image forming apparatus A. FIG. 4 is a perspective view showing a positioning portion between the process cartridge and the main assembly of the image forming apparatus arrow on a non-driving side in the state in which the process cartridge B in this embodiment is mounted in the main assembly of the image forming apparatus A.

When the process cartridge B is mounted in the main assembly of the image forming apparatus A, an openable door 13 is provided openably relative to the main assembly of the image forming apparatus A shown in FIG. 1. Thereafter, a tray 18 is pulled out. Then, the process cartridge B is mounted in and dismounted from the tray 18.

The process cartridge B is mounted in the main assembly of the image forming apparatus A along a guide rail (not shown) provided in the main assembly of the image forming apparatus A in a state in which the cartridge B is mounted on the tray 18.

As shown in FIG. 3, a first driving shaft 14 and a second driving shaft 19 for transmitting a driving force to a first coupling 70 and a second coupling 21, respectively, provided to the process cartridge B are provided. The first driving shaft 14 and the second driving shaft 19 are rotationally driven by a motor (not shown) which is a driving source provided in the main assembly side of the image forming apparatus A.

As a result, the photosensitive drum 62 connected with the first coupling 70 receives the driving force from the main assembly of the image forming apparatus A and is rotated. The developing roller 32 is rotated by transmission of the rotational driving force from the second coupling 21. To the charging roller 66 and the developing roller 32, a charging bias and a developing bias are supplied, respectively, by an unshown electric power supplying portion provided on the main assembly side of the image forming apparatus A.

(Supporting Portion of Process Cartridge)

The main assembly of the image forming apparatus A is provided with a driving(-side) side plate 15 shown in FIG. 3 and the non-driving(-side) side plate 16 shown in FIG. 4, for supporting the process cartridge B. The driving side plate 15 shown in FIG. 3 is provided with a first supporting portion 15a, a second supporting portion 15b and a rotation supporting portion 15c. On the other hand, the non-driving side plate 16 shown in FIG. 4 is provided with a first supporting portion 16a, a second supporting portion 16b and a rotation supporting portion 16c.

On the other hand, as portions-to-be-supported on the process cartridge B side, a portion-to-be-supported 73b and a portion-to-be-supported 73d which are shown in FIG. 3 and rotatably support of the photosensitive drum 62 and which are provided on a drum bearing 73 are provided. Further, a driving-side boss 71a, and a non-driving-side projection 71f shown in FIG. 4 and a non-driving side boss 71g shown in FIG. 4, which are provided to the cleaning frame 71 are provided.

As shown in FIG. 3, the portion-to-be-supported 73b is supported by the first supporting portion 15a, the portion-to-be-supported 73d is supported by the second supporting portion 15b, and the driving side boss 71a is supported by the rotation supporting portion 15c. Further, as shown in FIG. 4, the non-driving-side projection 71f is supported by the first supporting portion 16a and the second supporting portion 16b, and the non-driving-side boss 71g is supported by the rotation supporting portion 16c. As a result, the process cartridge B is positioned at the image forming position inside the main assembly of the image forming apparatus A.

<Process Cartridge>

Figure 5:
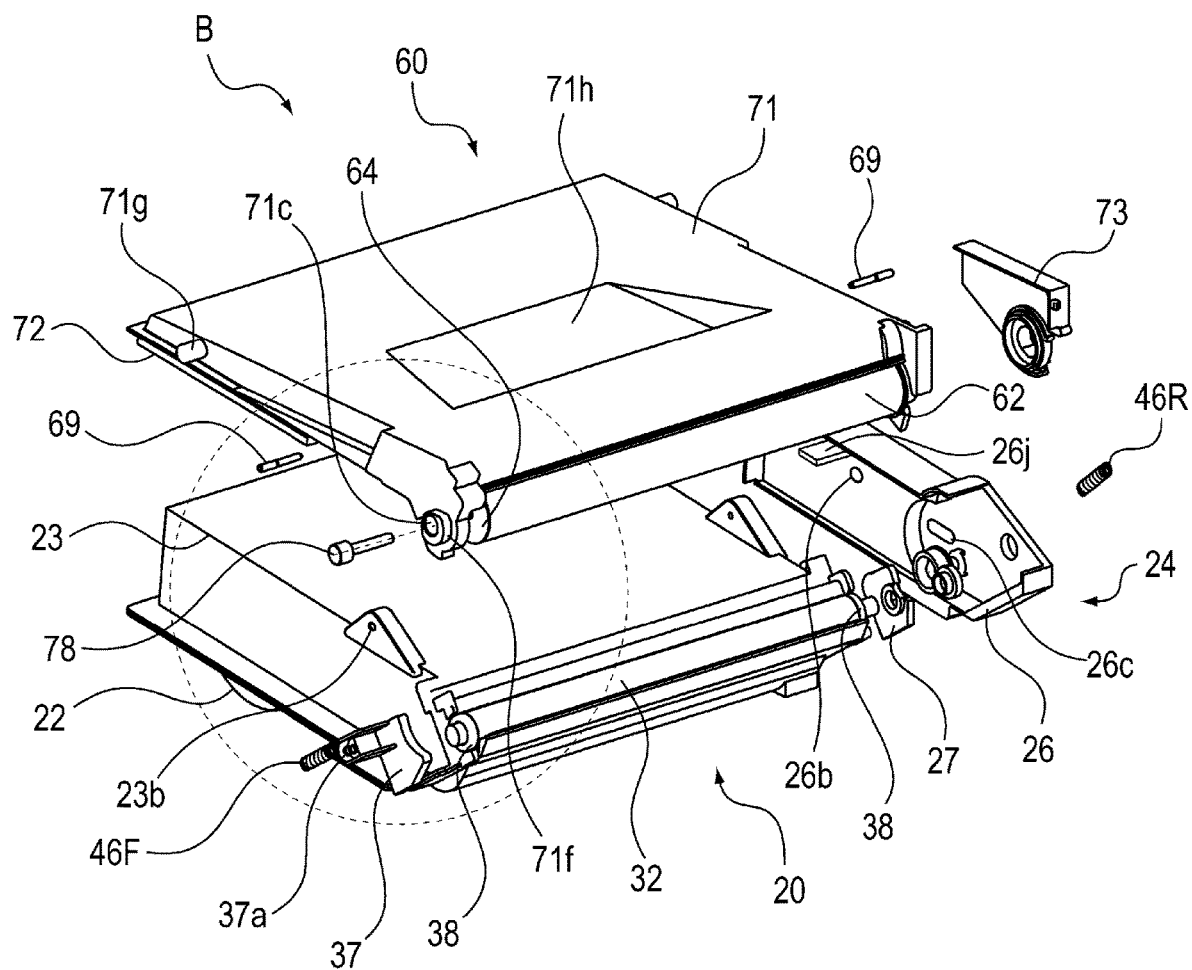
FIG. 5 is an exploded perspective view showing a structure of the process cartridge in the First Embodiment.
Figure 6:
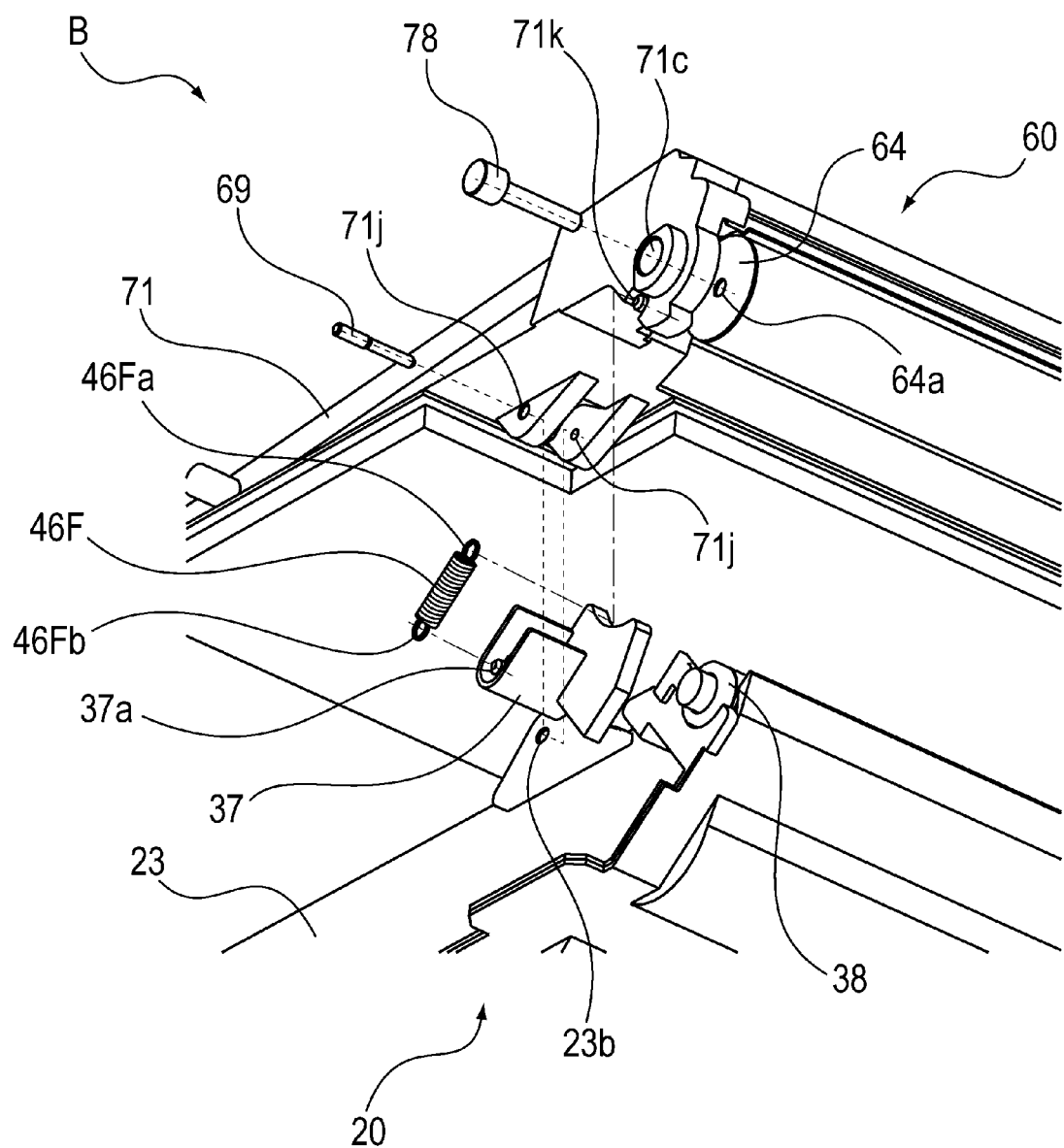
FIG. 6 is a partially enlarged view of FIG. 5 as seen from below.
Figure 7:
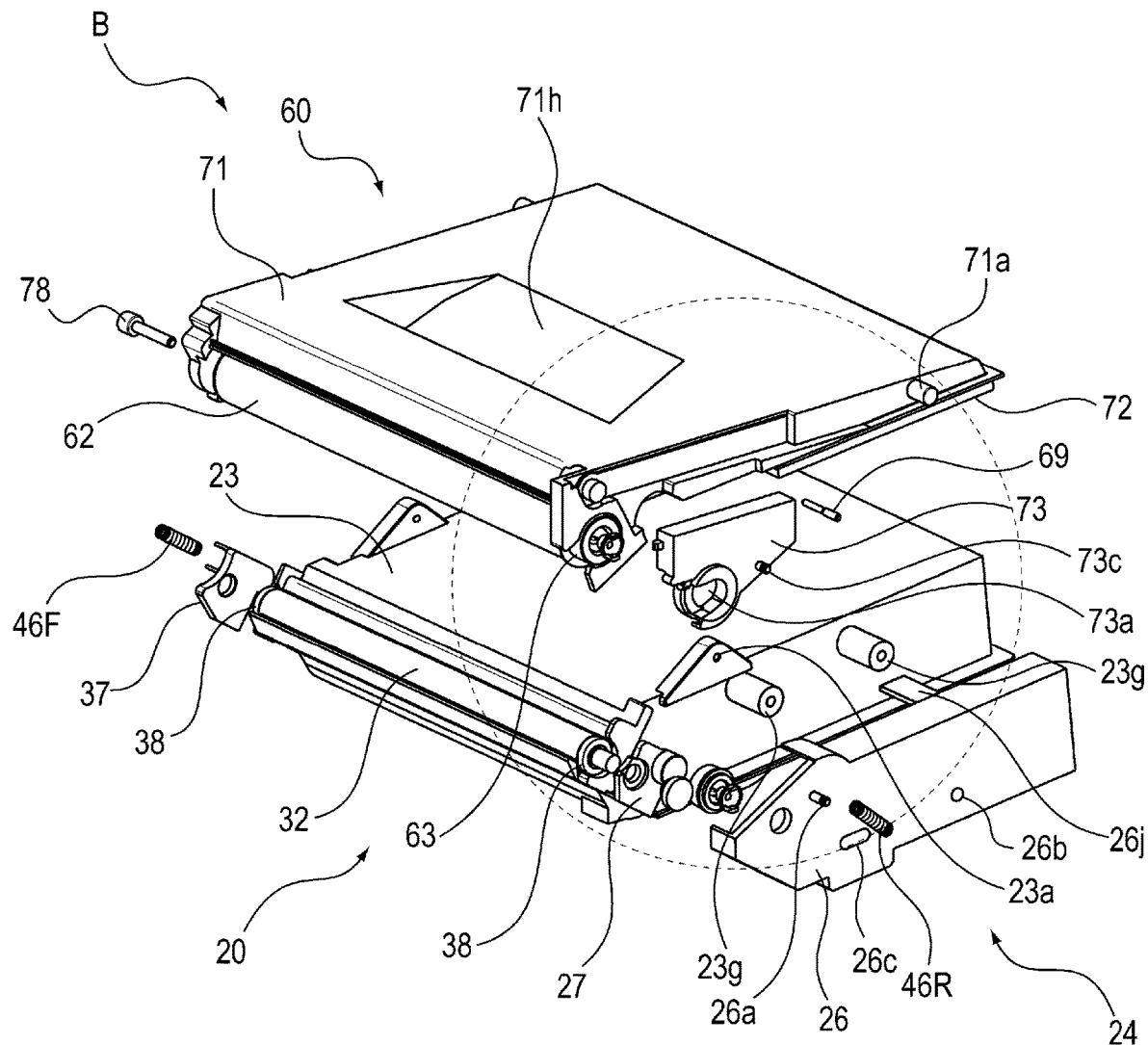
FIG. 7 is an enlarged perspective view showing a structure of the process cartridge in the First Embodiment.
Figure 8:
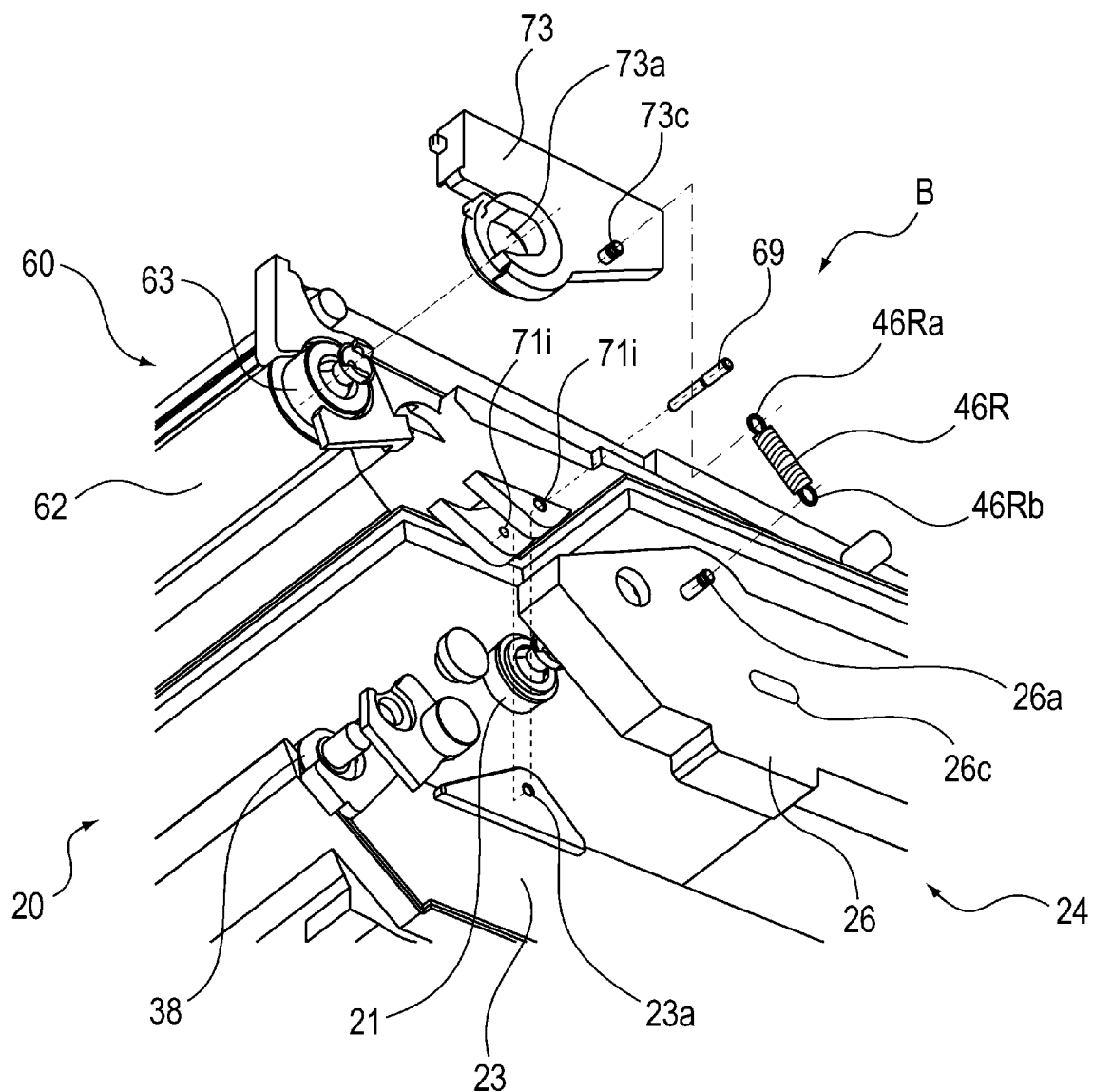
FIG. 8 is a partially enlarged view of FIG. 7 as seen from below.
Figure 9:
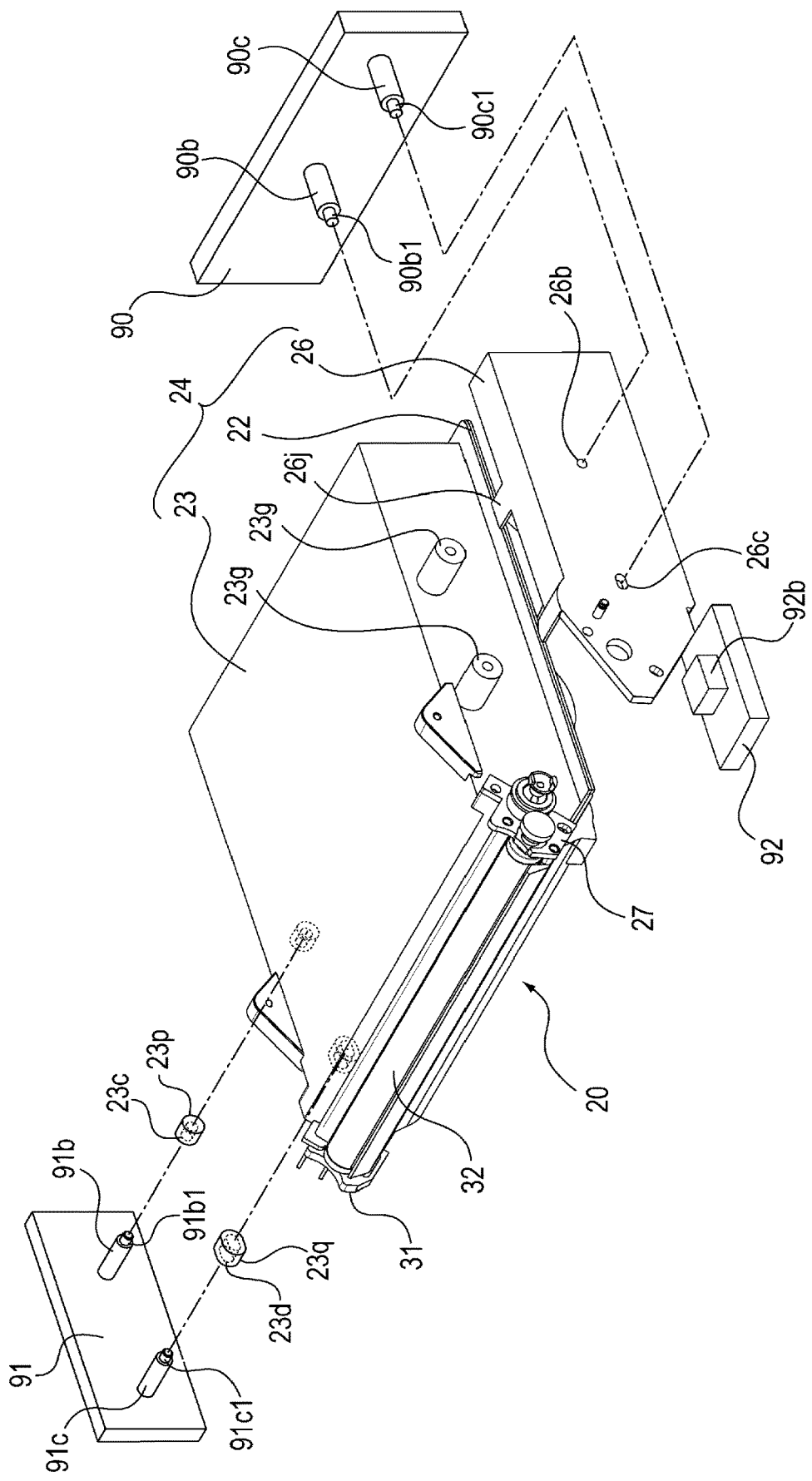
FIG. 9 is an exploded perspective view showing structures of a container main body and a side cover of a developer container in the First Embodiment.

A structure of the process cartridge B will be described using FIGS. 2 and 5 to 9. FIG. 5 is an exploded perspective view showing a structure of the process cartridge B in this embodiment. FIG. 6 is a partially enlarged view of FIG. 5 as seen from below. FIG. 7 is an enlarged perspective view showing a structure of the process cartridge B in this embodiment. FIG. 8 is a partially enlarged view of FIG. 7 as seen from below. FIG. 9 is an exploded perspective view showing the structure of the process cartridge B in this embodiment. Incidentally, screws connecting respective components parts are omitted from illustration.

As shown in FIGS. 2, 5 and 7, the process cartridge B is constituted by including the cleaning unit 60 and the developing unit 20. Incidentally, in general, the process cartridge B is prepared by integrally assembling the photosensitive drum 62 and at least one of the charging means, the developing means and the cleaning means as the image forming process means actable on the photosensitive drum 62 into a cartridge. Further, the process cartridge B is constituted so as to be mountable in and dismountable from the main assembly of the image forming apparatus A. The process cartridge B in this embodiment is constituted by including at least the photosensitive drum 62 and the cleaning unit 60.

<Cleaning Unit>

As shown in FIG. 2, the cleaning unit 60 includes the cleaning frame 71 and a cap member 72 fixed to the cleaning frame 71 by welding or the like. By the cleaning frame 71, the charging roller 66 and the cleaning member 77 are supported. In the cleaning unit 60, each of the charging roller 66 and the cleaning member 77 is disposed in contact with the surface of the photosensitive drum 62.

<Cleaning Member>

The cleaning member 77 includes a rubber blade 77a which is a blade-shaped elastic member formed with a rubber as an elastic material, and a supporting member 77b for supporting the rubber blade 77a. The rubber blade 77a is counterdirectionally disposed with respect to a rotational direction of the photosensitive drum 62 shown as an arrow R direction of FIG. 2 and contacts the surface of the photosensitive drum 62. That is, the rubber blade 77a is disposed so that a free end portion thereof extends toward an upstream side with respect to the rotational direction of the photosensitive drum 62 and contacts the surface of the photosensitive drum 62.

<Cleaning Frame>

As shown in FIG. 2, the residual toner removed from the surface of the photosensitive drum 62 by the cleaning member 77 supported by the cleaning frame 71 is fed by screws 86 and 88 as a residual toner feeding member. Then, the residual toner is collected in a residual toner chamber 71b formed by the cleaning frame 71 and the cap member 72.

The screw 86 is rotated by a gear (not shown) by transmission of a rotational driving force from a coupling 21 shown in FIG. 8 thereto via unshown gears. Between the screws 86 and 88, an unshown screw is provided so that a rotational axis direction thereof extends in a direction perpendicular to rotational axis directions of the screws 86 and 88. Through this unshown screw, between the screws 86 and 88 the rotational driving force is transmitted, so that the screw 88 is also rotated.

The screw 86 is disposed in the neighborhood of the photosensitive drum 62, the unshown screw is disposed at an end portion of the cleaning frame 71 with respect to the longitudinal direction, and the screw 88 is disposed in the residual toner chamber 71b. The rotational axis directions of the screws 86 and 88 are disposed in parallel to a rotational axis direction of the photosensitive drum 62, and a rotational axis direction of the unshown screw is perpendicular to the rotational axis direction of the photosensitive drum 62.

As shown in FIG. 2, at an edge portion of the cleaning frame 71, a sealing sheet 65 is provided. The sealing sheet 65 contacts the surface of the photosensitive drum 62. As a result, leakage of the residual toner from the cleaning frame 71 is prevented. The photosensitive drum 62 is rotationally driven in the arrow R direction of FIG. 2 depending on the image forming operation by receiving the rotational driving force from an unshown motor which is a driving source provided on the main assembly side of the image forming apparatus A.

The charging roller 66 is rotatably mounted in the cleaning unit 60 via bearings 67 at both end portions of the cleaning unit 60 with respect to the longitudinal direction (substantially parallel to the rotational axis direction of the photosensitive drum 62) of the cleaning frame 71. The charging roller 66 is press-contacted to the surface of the photosensitive drum 62 by pressing the bearings 67 toward a rotation center of the photosensitive drum 62 by urging members 68. The charging roller 66 is rotated by rotation of the photosensitive drum 62.

<Developing Unit>

As shown in FIG. 2, the developing unit 20 is constituted by including the developing roller 32, the developer container 24 for supporting the developing roller 32, the developing blade 42 and the like. The developer container 24 is constituted as a supporting unit including the container main body 23 and a bottom member 22 which are used as a frame and including a side cover 26 as a fixed member. The developer container 24 (supporting unit) supports a rotatable member for feeding the developer (toner). The container main body 23, the bottom member 22 and the side cover 26 are constituted by a thermoplastic resin material. A material of the container main body 23 and the bottom member 22 which are used as the frame and a material of the side cover 26 as the fixed member have compatibility with each other. By the container main body 23 and the bottom member 22 as the frame, an accommodating portion for accommodating the toner T (developer) is formed.

The container main body 23 is constituted as the frame for rotatably supporting the stirring members 50, 44 and 43, as rotatable members for feeding the toner T (developer), for stirring the toner T (developer). The stirring members 50, 44 and 43 are rotated in the clockwise direction of FIG. 1, whereby the stirring members 50, 44 and 43 successively feed the toner T (developer), accommodated in the accommodating portion formed by the frame comprising the container main body 23 and the bottom member 22, in a direction from left toward right of FIG. 1 while stirring the toner T (developer).

<Supporting Unit>

To the container main body 23 (frame) of the developer container 24 (supporting unit), the side cover 26 (fixed member) formed of the thermoplastic resin material is welded by ultrasonic spot welding.

<Frame>

A contacted surface 23g (first surface) of the container main body 23 (frame) extends in a direction crossing (preferably perpendicular to) axes of the stirring members 43, 44 and 50 (rotatable members). A contacted surface 23i (second surface) of the container main body 23 (frame) extends in a direction crossing (preferably perpendicular to) the contacted surface 23g (first surface).

On a side surface of the container main body 23 on a non-driving side (left side of FIGS. 9 and 10), projected portions 23p and 23q projecting toward an outside of the container main body 23 are provided. Inside the projected portions 23p and 23q, a reference recessed portion 23c comprising a recessed portion having an outer configuration similar to a reference hole 26b provided in the side cover 26 and an elongated recessed portion 23d which comprises a recessed portion having an outer configuration similar to an elongated hole 26c and which extends along a direction crossing (preferably perpendicular to) the axial direction of the developing roller 32 are provided. Incidentally, in this embodiment, the projected portions 23p and 23q are integrally formed with the container main body 23. In FIG. 9, in order to explain structures of the projected portions 23p and 23q, the projected portions 23p and 23q are illustrated at positions spaced from the container main body 23.

<Fixed Member>

A contacting surface 26g (first opposing surface) of the side cover 26 (fixed member) opposes the contacted surface 23g (first surface) of the container main body 23 (frame) and contacts the contacted surface 23g (first surface).

In this state, an overhanging portion 26j of the side cover 26 (fixed member) overlaps with the contacted surface 23i (second surface) of the container main body 23 with respect to a direction crossing (preferably perpendicular to) the axes of the stirring members 43, 44 and 50 (rotatable members). That is, a contacting surface 26j2 (second opposing surface) of the overhanging portion 26j on a back surface side of the overhanging portion 26j and the contacted surface 23i (second surface) which is a top surface of the container main body 23 (frame) overlap with each other with respect to a vertical (up-down) direction of FIG. 12.

The contacting surface 26j2 (second opposing surface) of the side cover 26 (fixed member) opposes the contacted surface 23i (second surface) of the container main body 23 (frame) and is welded to the contacted surface 23i (second surface) of the ultrasonic spot welding.

The overhanging portion 26j is constituted in a flat plate shape constituted by a flat surface with no unevenness at front and back surfaces of the overhanging portion 26j. At least a front-side opposing surface 26j1 and the back-side opposing surface 26j2 (second opposing surface) of the overhanging portion 26j welded to the contacted surface 23i (second surface) of the container main body 23 8frame) by the ultrasonic spot welding are constituted by the flat surface.

Inside the developing roller 32, a magnet roller 34 is provided. In the developing unit 20, the developing blade 42 for regulating a layer thickness of the toner carried on the surface of the developing roller 32 is provided. As shown in FIGS. 5 and 7, a gap-maintaining member 38 is provided at each of end portions of the developing roller 32. By contact between the gap-maintaining member 38 and the photosensitive drum 62, the developing roller 32 is held with a minute gap from the photosensitive drum 62.

As shown in FIG. 2, a developer sealing sheet 33 is provided at an edge portion of the bottom member 22 in contact with the surface of the developing roller 32. The developer sealing sheet 33 prevents the leakage of the toner T from the developing unit 20.

In the stirring chamber 29 formed by the container main body 23 and the bottom member 22, the stirring members 43, 44 and 50 are provided. The stirring members 43, 44 and 50 not only stir the toner T accommodated in the stirring chamber 29 but also feed the toner T to the developing chamber 28.

As shown in FIGS. 5 and 7, the process cartridge B is constituted by combining the cleaning unit 60 and the developing unit 20.

In the cleaning unit 60, a cleaning frame 71, a cap member 72, the photosensitive drum 62, a drum bearing 73 for rotatably supporting the photosensitive drum 62, and a drum shaft 78 are provided. As shown in FIG. 8, on a driving side, a drum flange 63 is inserted into a hole 73a of the drum bearing 73, so that the photosensitive drum 62 is rotatably supported.

On the other hand, as shown in FIG. 6, on the non-driving side, a constitution in which the drum shaft 78 press-fitted in a hole 71c provided in the cleaning frame 71 is inserted into a hole 64a of a drum flange 64 and rotatably supports the photosensitive drum 62 is employed. In the developing unit 20, the bottom member 22, the container main body 23, the developing blade 42, the developing roller 32 and the like are provided. The developing roller 32 is rotatably supported by bearing members 27 and 37 provided on the container main body 23. Outside the bearing member 27, the side cover 26 is provided. The side cover 26 is bonded to the container main body 23 by the ultrasonic spot welding.

As shown in FIGS. 6 and 8, supporting holes 23a and 23b are provided at longitudinal end portions of the developer container 24 of the developing unit 20. At longitudinal end portions of the cleaning frame 71 of the cleaning unit 60, hanging holes 71i and 71j are provided. A connecting pin 69 is inserted into the hanging holes 71i and 71j of the cleaning frame 71 and the supporting holes 23a and 23b of the container main body 23 and the connecting pin 69 press-fitted and fixed in the first hanging holes 71i and 71j. The supporting hole 23a and 23b slidably engage with the connecting pin 69. As a result, the cleaning unit 60 and the developing unit 20 are rotatably connected with each other by the connecting pin 69. As a result, the process cartridge B is prepared.

Further, a hole 46Ra of a driving-side-urging member 46R shown in FIG. 8 is hooked on a boss 73c projected from the surface of the drum bearing 73, and a hole 46Rb of the urging member 46R is hooked on a boss 26a projected from the surface of the side cover 26. Further, a first hole 46Fa of a non-driving-side urging member 46F shown in FIG. 6 is hooked on a boss 71k provided on the cleaning frame 71, and a second hole 46Fb of the urging member 46F is hooked on a boss 37a provided on the bearing member 37.

In this embodiment, each of the urging members 46R and 46F is constituted by a tension spring. The developing unit 20 is urged toward the cleaning unit 60 by urging forces of the urging members 46R and 46L, so that the developing roller 32 provided in the developing unit 20 is pressed toward the drum 62 provided in the cleaning unit 60. Then, by the gap maintaining members 38 provided at the end portions of the developing roller 32 with respect to the axial direction, the surface of the developing roller 32 is held with a predetermined minute gap from the surface of the drum 62.

<Manufacturing Method of Supporting Unit>

Figure 10:
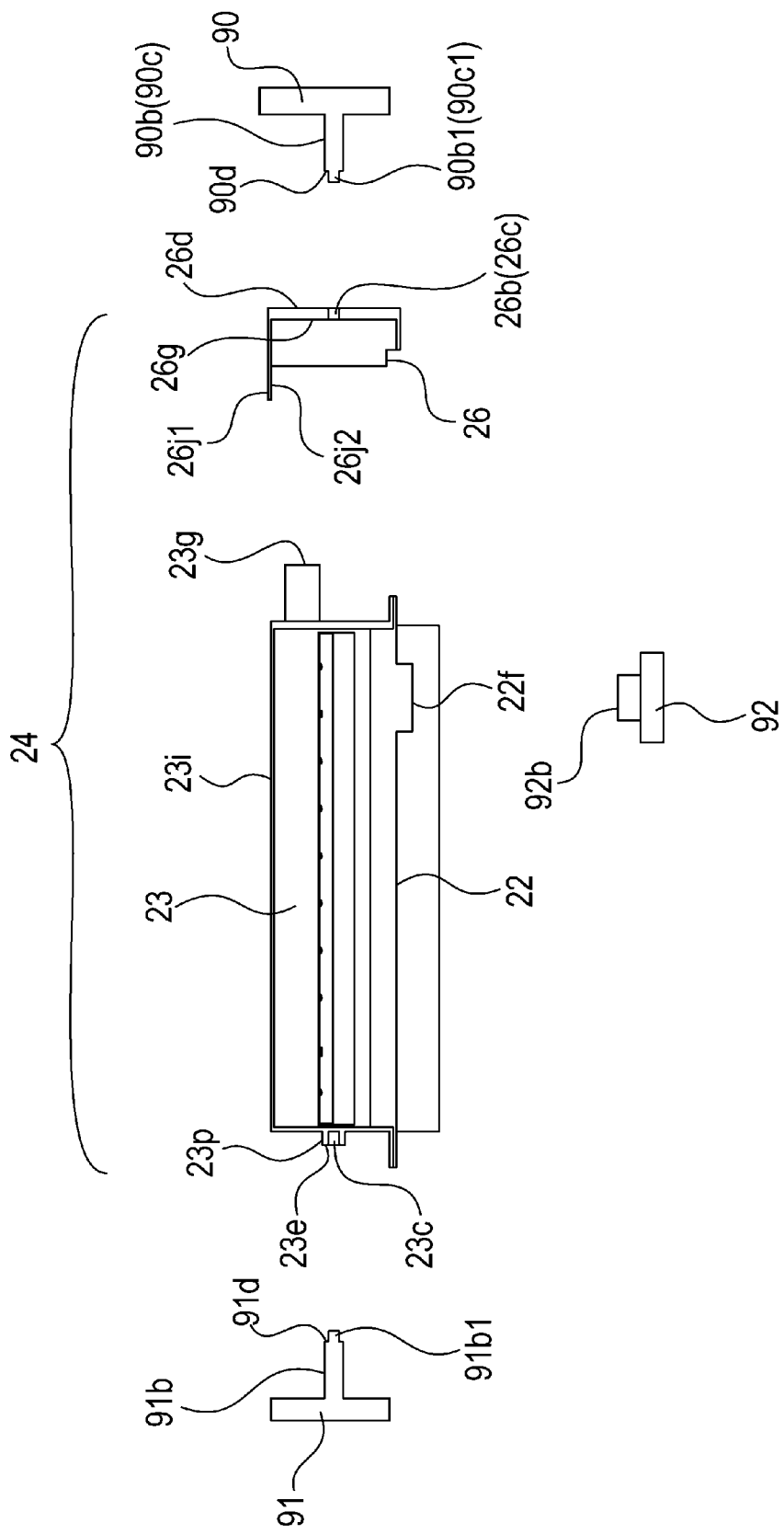
FIG. 10 is a sectional view showing the structures of the container main body and the side cover of the developer container in the First Embodiment.
Figure 11:
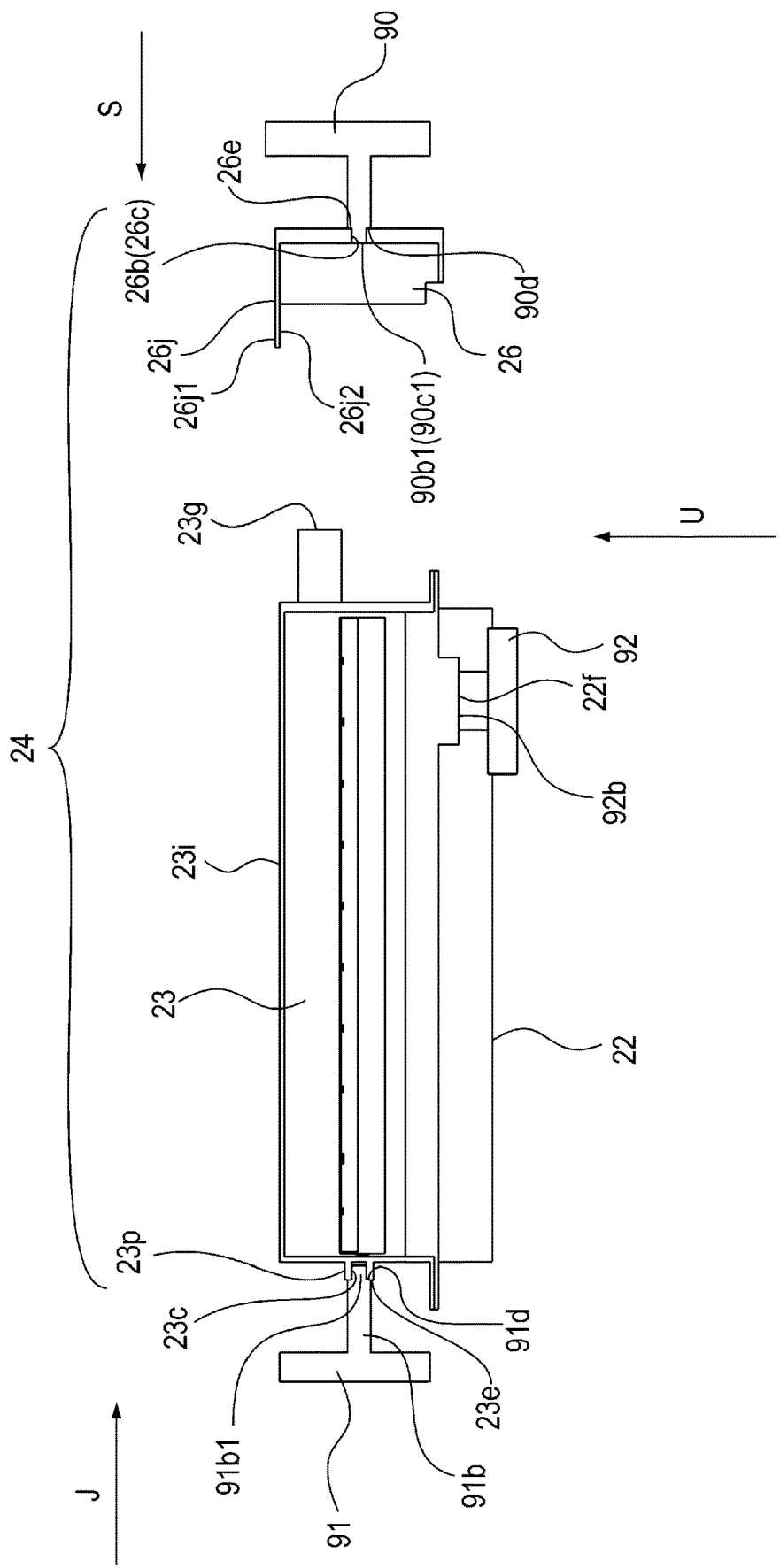
FIG. 11 is a sectional view for illustrating an assembling method before the side cover is connected to the container main body of the developer container in the First Embodiment.
Figure 12:
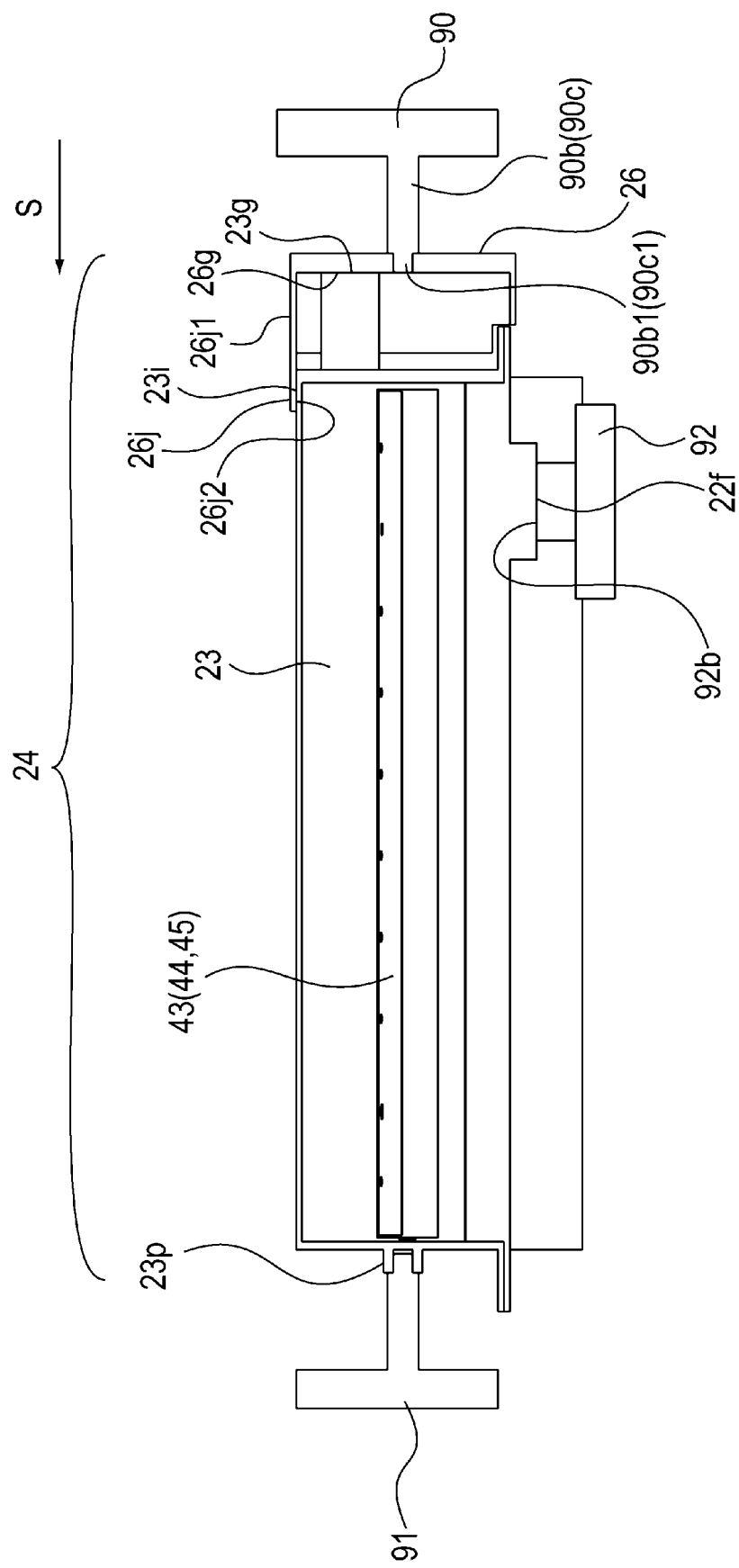
FIG. 12 is a sectional view for illustrating the assembling method before the side cover is connected to the container main body of the developer container in the First Embodiment.
Figure 13:
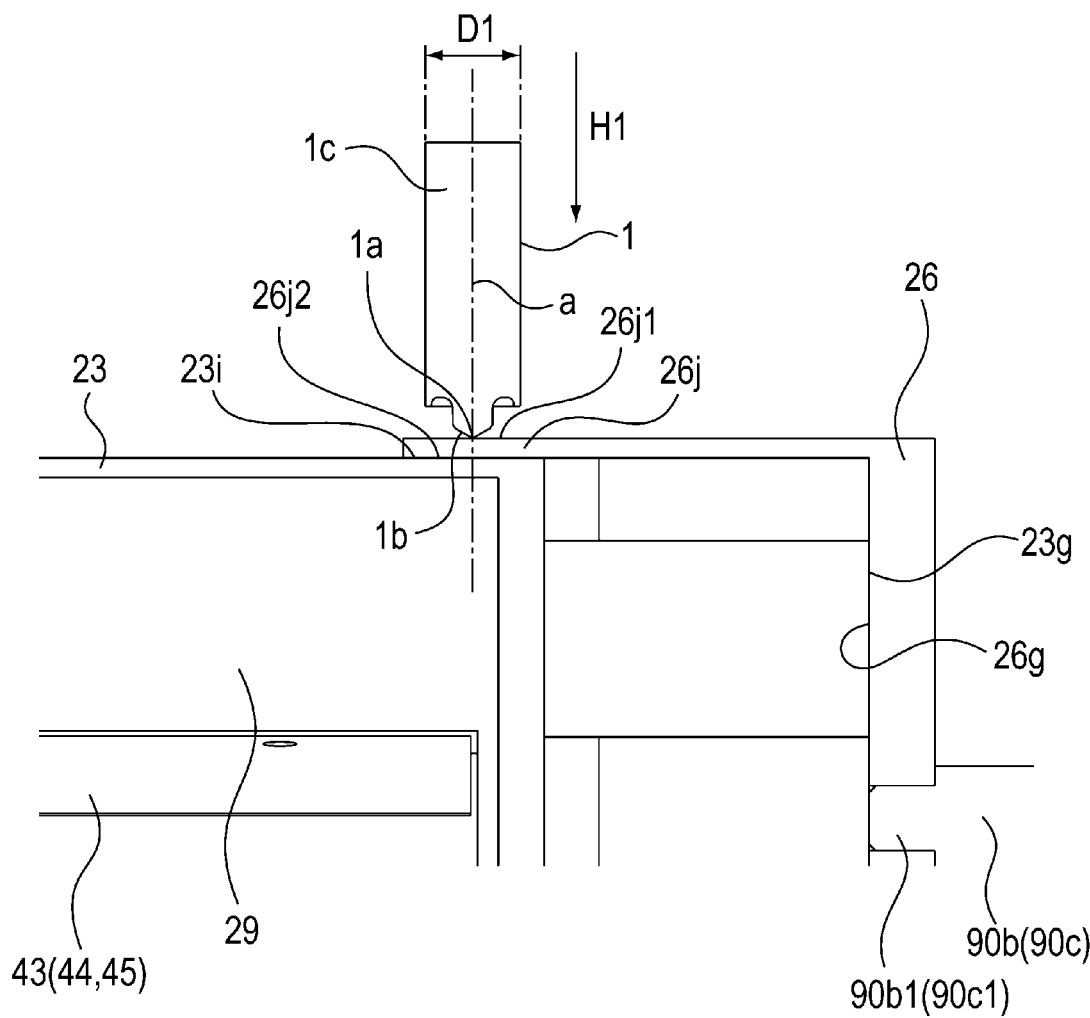
FIG. 13 is a sectional view for illustrating a bonding method between the container main body and the side cover of the developer container in the First Embodiment.
Figure 14:
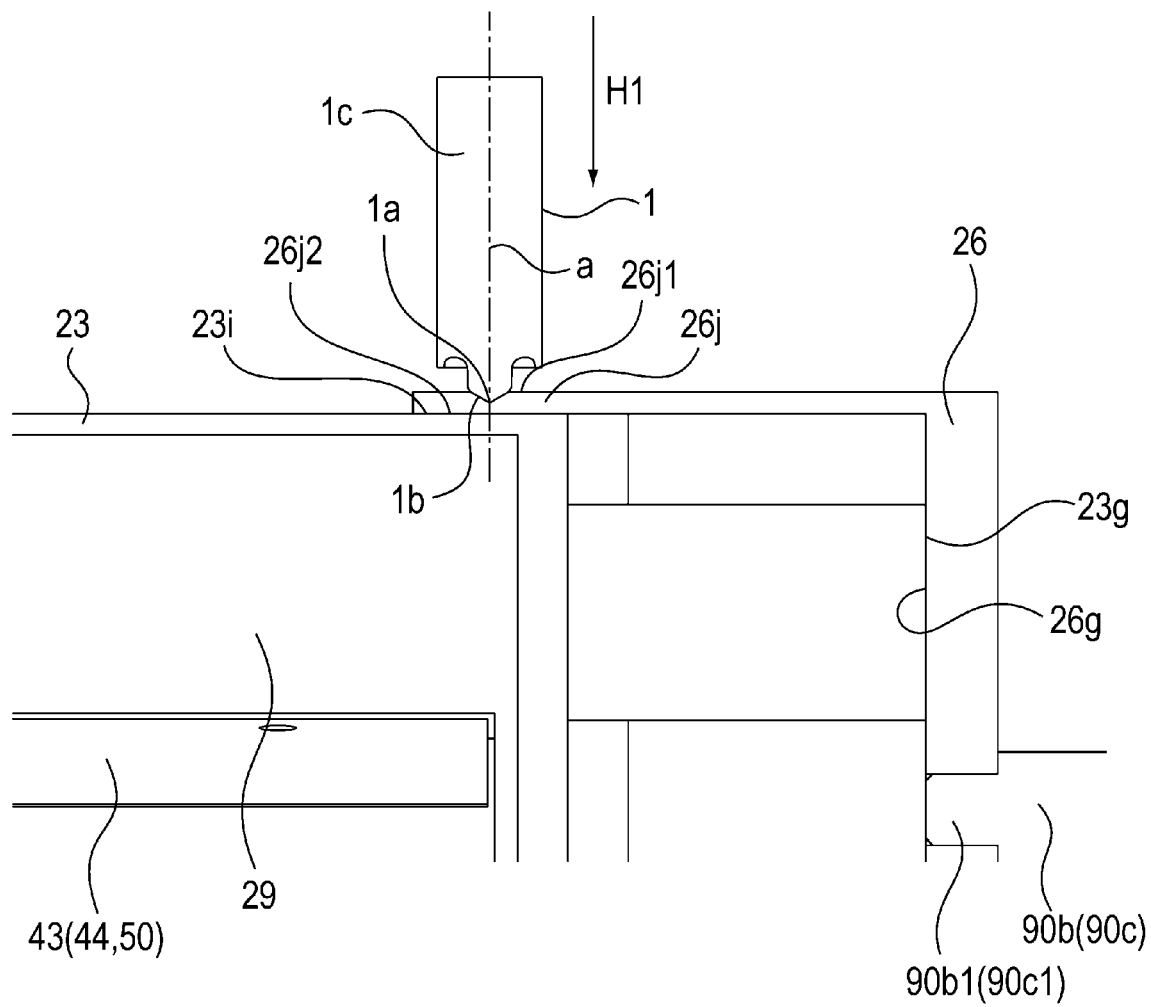
FIG. 14 is a sectional view for illustrating the bonding method between the container main body and the side cover of the developer container in the First Embodiment.
Figure 15:
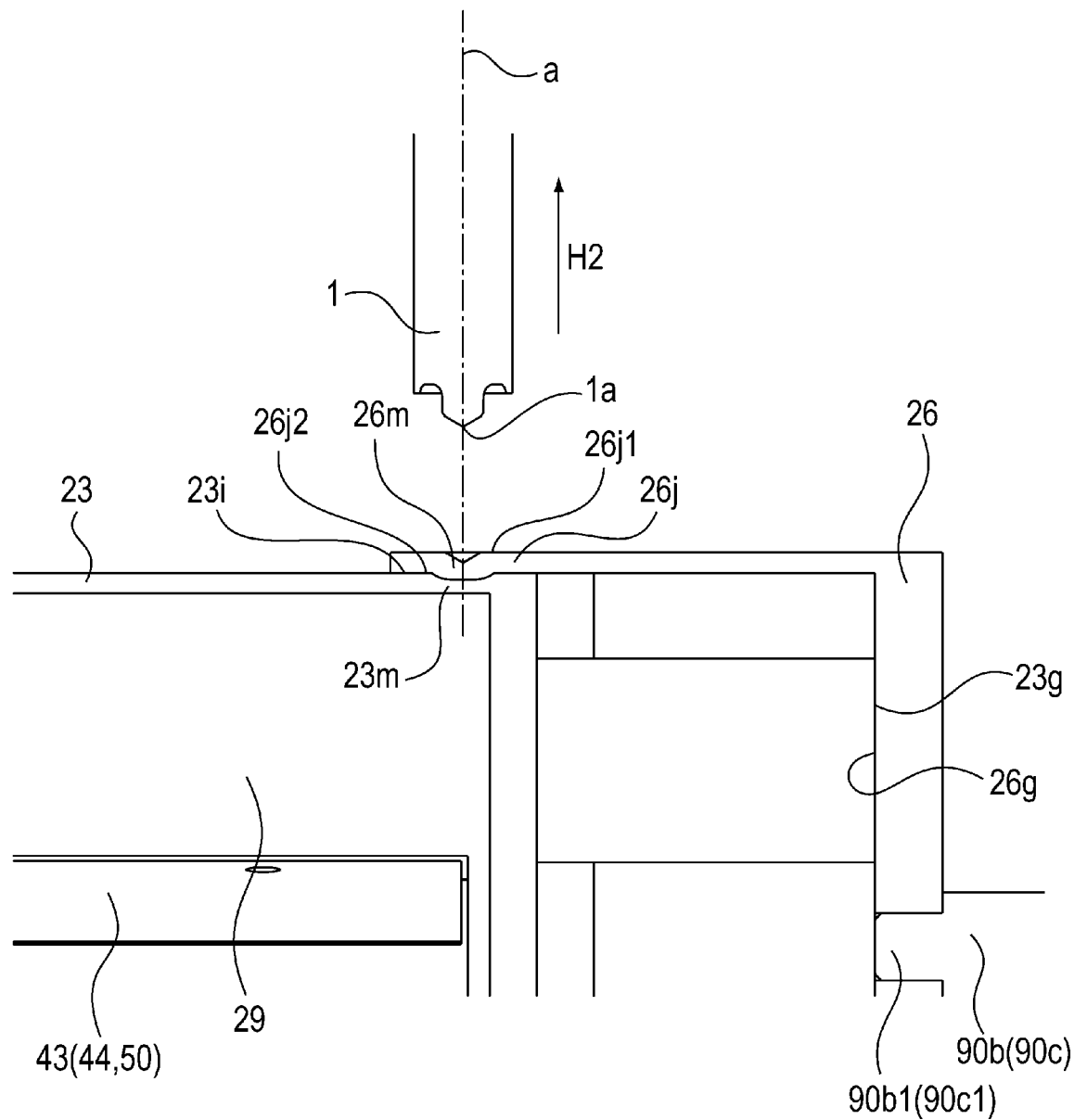
FIG. 15 is a sectional view for illustrating the bonding method between the container main body and the side cover of the developer container in the First Embodiment.

A manufacturing method of the supporting unit will be described using FIGS. 9 to 15. FIG. 9 is an exploded perspective view showing structures of the container main body 23 and the side cover 26 in this embodiment. FIG. 10 is a sectional view showing the structures of the container main body 23 and the side cover 26 in this embodiment. FIGS. 11 and 12 are sectional views for illustrating an assembling method before the side cover 26 is connected to the container main body 23 in this embodiment. FIGS. 13 to 15 are sectional views for illustrating a bonding method between the container main body 23 and the side cover 26 in this embodiment.

<Assembling Between Side Cover and Frame Before Bonding>

As shown in FIGS. 9 and 10, on the driving side (on the right side of FIGS. 9 and 10) of the container main body 23, the side cover 26 is disposed, and on a further outside of the side cover 26, an assembling jig 90 used when the side cover 26 is assembled with the container main body 23 is provided. The assembling jig 90 is constituted as a first holding member for holding the side cover 26 (fixed member).

On the non-driving side (on the left side of FIGS. 9 and 10) of the container main body 23, an assembling jig 91 is provided. The assembling jig 91 is constituted as a second holding member for holding the container main body 23 (frame). During bonding between the side cover 26 and the frame (the container main body 23 and the bottom member 22), the container main body 23 and the bottom member 22 are bonded to and integrated with each other in advance. For this reason, the assembling jig 91 is constituted as the second holding member for holding the frame comprising the container main body 23 and the bottom member 22. Further, outside the bottom member 22 (frame) with respect to a direction perpendicular to the axial direction of the developing roller 32, an assembling assisting jig 92 is provided.

The side cover 26 is provided with the reference hole 26b and the elongated hole 26c extending along the direction crossing (preferably perpendicular to) the axial direction of the developing roller 32. The reference hole 26b and the elongated hole 26c are provided by being penetrated through the side cover 26. The assembling jig 90 is provided with shafts 90b and 90c including projected portions 90b1 and 90c1 to be engaged with the reference hole 26b and the elongated hole 26c which are provided in the side cover 26.

When the assembling jig 90 is moved in an arrow S direction of FIG. 11, the projected portions 90b1 and 90c1 provided at free end portions of the shafts 90b and 90c are engaged in the reference hole 26b and the elongated hole 26c, respectively, of the side cover 26. Then, abutting surfaces 90d formed at base portions of the projected portions 90b1 and 90c1 of the shafts 90b and 90c of the assembling jig 90 contact abutted surfaces 26e of the side cover 26. As a result, the side cover 26 is held by the assembling jig 90.

The assembling jig 91 is provided with shafts 91b and 91c including projected portions 91b1 and 91c1 to be engaged with the reference recessed portion 23c and the elongated recessed portion 23d which are provided inside the projected portions 23p and 23q projected from the side surface of the container main body 23 on the non-driving side (left side of FIGS. 9 and 10).

When the assembling jig 91 is moved in an arrow J direction of FIG. 11, the projected portions 91b1 and 91c1 provided at free end portions of the shafts 91b and 91c are engaged in the reference recessed portion 23c and the elongated recessed portion 23d, respectively, of the container main body 23. Then, abutting surfaces 91d formed at base portions of the projected portions 91b1 and 91c1 of the shafts 91b and 91c of the assembling jig 91 contact abutted surfaces 23e comprising top surfaces 23p and 23q of the container main body 23.

Further, when the assembling assisting jig 92 is moved in an arrow U direction, an abutting surface 92b of the assembling assisting jig 92 and an abutted surface 22f provided on a bottom (surface) of the bottom member 22 are in contact with each other. As a result, the container main body 23 and the bottom member 22 are held by the assembling jig 91 and the assembling assisting jig 92. Further, the assembling jig 90 is moved in the arrow S direction of FIG. 12 in a state in which the side cover 26 is held by the assembling jig 90. As a result, as shown in FIG. 12, the contacting surface 26g (first opposing surface) of the side cover 26 is contacted to the contacted surface 23g (first surface) projected from the side surface of the container main body 23 (frame).

As the manufacturing method of the supporting unit, the side cover 26 held by the assembling jig 90 (first holding member) is moved in a first direction (arrow S direction of FIG. 11). Further, the frame (the container main body 23 and the bottom member 22) held by the assembling jig 91 (second holding member) is moved in the first direction (arrow J direction of FIG. 11).

Then, the contacted surface 23g (first surface) of the container main body 23 (frame) and the contacting surface 26g (first opposing surface) of the side cover 26 (fixed member) are caused to be in contact with each other. As a result, positions of the side cover 26 and the container main body 23 with respect to the axial directions of the stirring members 43, 44 and 50 (rotatable members) are determined.

Thus, the positions of the side cover 26 (fixed member) and the frame (the container main body 23 and the bottom member 22) are determined by the assembling jigs 90 and 91 and the assembling assisting jig 92. At this time, the contacting surface 26j2 provided on the back surface side of the overhanging portion 26j of the side cover 26 and the contacted surface 23i of the container main body 23 contact each other.

That is, at least either one of the side cover 26 (fixed member) and the container main body 23 (frame) is moved. Then, the contacted surface 23g (first surface) of the container main body 23 (frame) and the contacting surface 26g (first opposing surface) of the side cover 26 (fixed member) are caused to be in contact with each other. Further, the contacted surface 23i (second surface) of the container main body 23 (frame) and the contacting surface 26j2 (second opposing surface) of the side cover 26 (fixed member) are opposed to each other. Such manufacturing steps are performed. As a result, assembling of the side cover 26 and the container main body 23 before the side cover 26 is connected with the container main body 23 is completed.

<Bonding of Side Cover and Frame by Ultrasonic Spot Welding>

Next, using FIGS. 13 to 15, a method of connecting the side cover 26 with the container main body 23 by the ultrasonic spot welding will be described. FIGS. 13 to 15 are enlarged sectional views showing a welding portion between the side cover 26 and the container main body 23.

<Ultrasonic Spot Welding>

A bonding method by the ultrasonic spot welding used in the present invention will be described. The ultrasonic spot welding is one method of bonding two members with ultrasonic waves. In the ultrasonic spot welding, an oscillator for generating ultrasonic vibration and a resonator attached to the oscillator and transmitting the ultrasonic vibration to the members are used. The resonator is called a horn or a welding horn. The welding horn applies certain pressure to the members and transmits the ultrasonic vibration to the members. As a result, frictional heat generates between resin materials of the two members. By this frictional heat, the resin materials are melted, and thereafter are solidified by being cooled. As a result, the members are bonded to each other.

The methods of the two members to be bonded to each other by the ultrasonic spot welding may desirably include a thermoplastic resin material. Further, the materials of the two members may preferably have compatibility therebetween at least at a melted portion in order to enhance bonding strength between the two members. The materials of the two members may further desirably be the same. In this embodiment, as materials of the frame (the container main body 23 and the bottom member 22) as a first member and the side cover 26 as a second member which are described later, the same styrene-based thermoplastic resin material was used.

The welding horn used in the ultrasonic spot welding will be described. As shown in FIG. 13, a welding horn 1 includes a cylindrical portion 1c having a diameter D1 and a tapered portion 1b decreased in diameter from the cylindrical portion 1c toward a horn free end portion 1a. In other words, the welding horn 1 has a shape such that the horn free end portion 1a becomes pointed. By using the welding horn 1 having such a free end shape, the two members can be bonded to each other without forming projected shapes (so-called ultrasonic joints) for transmitting ultrasonic waves to the two members to be bonded to each other.

The welding horn 1 is ultrasonic-vibrated by an unshown oscillator. The ultrasonic vibration of the welding horn 1 is transmitted to the side cover 26 and the container main body 23 which are made of the resin materials, so that frictional heat is generated between the two resin materials. By this frictional heat, the resin materials can be melted and bonded to each other. Incidentally, as a usable resin material, it is possible to use a thermoplastic resin material such as polystyrene.

As shown in FIG. 13, the welding horn 1 for performing the ultrasonic spot welding is contacted to the side cover 26 (fixed member) from a direction crossing (preferably from an arrow H1 direction of FIG. 13 perpendicular to) the contacting surface 26j2 (second opposing surface) of the side cover 26 (fixed member). Then, the contacting surface 26j2 (second opposing surface) of the side cover 26 (fixed member) and the contacted surface 23i (second surface) of the container main body 23 (frame) are melted. As a result, the container main body 23 (frame) and the side cover 26 (fixed member) are bonded to each other. Such manufacturing steps are performed.

In a state in which the welding horn 1 is contacted to the side cover 26 (fixed member), the welding horn 1 is moved in a horn entrance direction shown by the arrow H1 direction of FIG. 13. Then, the horn free end portion 1a of the welding horn 1 contacts the opposing surface 26j1 on the front surface side of the overhanging portion 26j of the side cover 26 opposing the contacting surface 26j2 contacting the contacted surface 23i of the container main body 23 on the back surface side of the overhanging portion 26j of the side cover 26.

At this time, the welding horn 1 applies a predetermined load in the arrow H1 direction of FIG. 13 to the opposing surface 26j1 of the overhanging portion 26j of the side cover 26 on the front surface side of the overhanging portion 26j. In a state in which the welding horn 1 applies the predetermined load to the opposing surface 26j1 on the front surface side of the overhanging portion 26j of the side cover 26, the welding horn 1 is ultrasonic-vibrated, so that the frictional heat generates between the horn free end portion 1a of the welding horn 1 and the opposing surface 26j1.

By this frictional heat, the opposing surface 26j1 is melted, and as shown in FIG. 14, the horn free end portion 1a of the welding horn 1 enters an inside of the overhanging portion 26j of the side cover 26. That is, the side cover 26 (fixed member) is melted by the frictional heat due to the ultrasonic spot welding of the welding horn 1, so that the horn free end portion 1a of the welding horn 1 is caused to enter the inside of the side cover 26 (fixed member).

Incidentally, the stirring chamber 29 (accommodating portion) shown in FIG. 14 is constituted as a space in which the toner T (developer) is accommodated. Here, as shown in FIGS. 14 and 15, the contacting surface 26j2 (second opposing surface) of the side cover 26 and the contacted surface 23i (second surface) of the container main body 23 (frame) which are surfaces to be welded will be considered.

Further, a rectilinear line a which is perpendicular to the contacting surface 26j2 (second opposing surface) and the contacted surface 23i (second surface) and which passes through welded portions (melted portions 26m and 23m) to be welded by the ultrasonic spot welding will be considered. The rectilinear line a passes through the stirring chamber 29 (accommodating portion). That is, with respect to the longitudinal direction (left-right directions of FIGS. 14 and 15) of the container main body 23, positions of the welded portions (melted portions 23m and 26m) and the stirring chamber 29 (accommodating portion) overlap with each other.

Even in the case where such an arrangement is made, according to the ultrasonic spot welding, as shown in FIG. 15, the welded portions 26m and 23m are formed, and therefore, there is no generation of a hole through which an outside of the stirring chamber 29 (accommodating portion) communicates with an inside of the stirring chamber 29, so that leakage of the toner T (developer) from the stirring chamber 29 (accommodating portion) is prevented. For this reason, the stirring chamber 29 (accommodating portion) can be expanded in axial directions (left-right directions of FIGS. 14 and 15), and thus an accommodating amount of the toner T (developer) in the stirring chamber 29 (accommodating portion) can be increased. When the accommodating amount of the toner T (developer) in the stirring chamber 29 (accommodating portion) is the same, the screw can be downsized.

The welding horn 1 imparts the ultrasonic vibration to the inside of the side cover 26, so that the ultrasonic vibration is also transmitted to the contacting surface 26j2 of the overhanging portion 26j on the back surface side of the overhanging portion 26j. As a result, the contacting surface 26j2 is melted, so that the melted portion 26m is formed. Further, the melted portion 26m contacts the contacted surface 23i of the container main body 23, so that the melted portion 23m is formed by frictional heat between the melted portion 26m and the contacted surface 23i.

Thereafter, the welding horn 1 is retracted in an arrow H2 direction of FIG. 15, and the respective melted portions 26m and 23m are cooled and solid field. That is, by the frictional heat due to the ultrasonic spot welding of the welding horn 1, the contacting surface 26j2 (second opposing surface) of the side cover 26 (fixed member) and the contacted surface 23i (second surface) of the container main body 23 (frame) are melted, and thereafter are cooled and solidified. As a result, the overhanging portion 26j of the side cover 26 and the container main body 23 are in a state in which the respective melted portions 26m and 23m which are solidified are integrally bonded to each other. As a result, bonding between the side cover 26 and the container main body 23 by the ultrasonic spot welding is completed.

At this time, as shown in FIG. 15, the contacted surface 23g (first surface) of the container main body 23 (frame) and the contacting surface 26g (first opposing surface) of the side cover 26 (fixed member) are in contact with each other. In that state, the contacted surface 23i (second surface) of the container main body 23 (frame) and the contacting surface 26j2 (second opposing surface) of the side cover 26 (fixed member) are welded by the ultrasonic spot welding.

In this embodiment, the overhanging portion 26j of the side cover 26 and the container main body 23 are bonded to each other through the ultrasonic spot welding by inserting the welding horn 1 from the arrow H1 direction of FIG. 13 crossing (preferably perpendicular to) the axial directions of the stirring members 43, 44 and 50 (rotatable members). As a result, there is no need to provide a recessed portion, for permitting insertion of the horn free end portion 1a of the welding horn 1, at a portion to be subjected to the ultrasonic spot welding, so that a space for the ultrasonic spot welding is made small and thus downsizing of the container main body 23 is realized.

Further, in a state in which the side cover 26 and the container main body 23 are held by the assembling jigs 90 and 91 and the assembling assisting jig 92, the ultrasonic spot welding can be performed. As a result, there is no occurrence of positional deviation between the side cover 26 and the container main body 23 caused by the influence of a load during the ultrasonic spot welding. The ultrasonic spot welding is a simple and inexpensive bonding method by welding.

Second Embodiment

Next, structures of the supporting unit, the developer container, the developing device, the photosensitive member unit, the process cartridge and the manufacturing method of the supporting unit according to the present invention in a Second Embodiment will be described using FIGS. 16 to 18.

Figure 16:
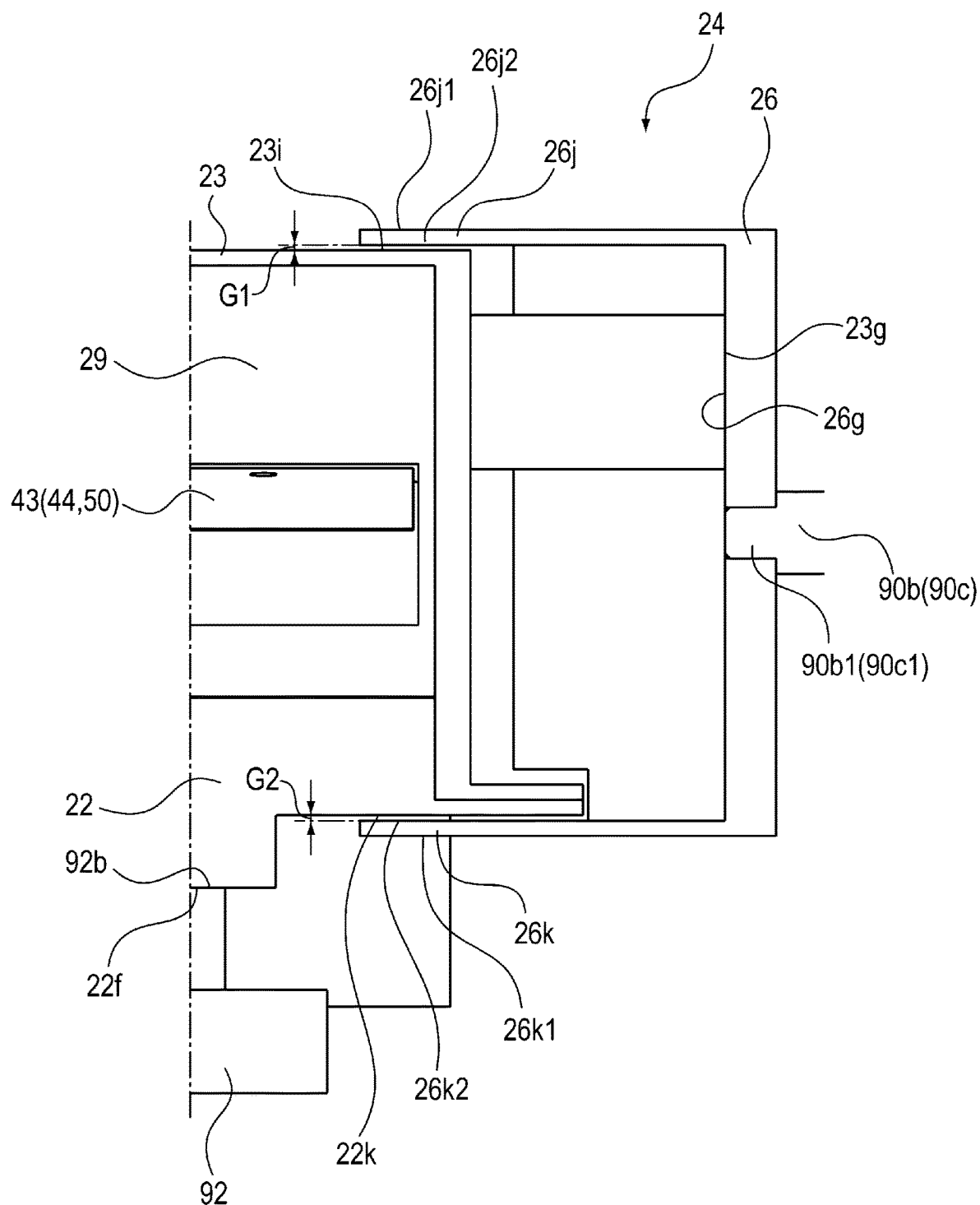
FIG. 16 is a sectional view for illustrating an assembling method before a container main body, a bottom member and a side cover of a developer container in a Second Embodiment.

FIG. 16 is a sectional view for illustrating an assembling method before the frame (the container main body 23 and the bottom member 22) and the side cover 26 in this embodiment are bonded to each other. FIG. 17 is a sectional view for illustrating a bonding method of the frame (the container main body 23 and the bottom member 22) and the side cover 26 in this embodiment. FIG. 18 is a sectional view for illustrating the bonding method of the frame (the container main body 23 and the bottom member 22) and the side cover 26 in this embodiment.

In the First Embodiment described above, as shown in FIGS. 7 and 9 to 12, a constitution in which the overhanging portion 26j of the side cover 26 was provided only on the container main body 23 side was employed. In this embodiment, as shown in FIGS. 16 to 18, an example in which overhanging portions 26j and 26k are provided on both of the container main body 23 side and the bottom member 22 side is employed.

<Frame>

A contacted surface 22k (third surface) provided on the bottom member 22 (frame) extends in a direction crossing (preferably perpendicular to) the contacted surface 23i (first surface) provided on the container main body 23 (frame).

The contacted surface 22k (third surface) of the bottom member 22 (frame) extends in the direction crossing (preferably perpendicular to) the contacted surface 23g (first surface) of the container main body 23 (frame). The contacted surface 22k (third surface) and the contacted surface 23i (second surface) are parallel to each other.

<Fixed Member>

The overhanging portion 26j (first overhanging portion) is constituted in a flat plate shape which overlaps with the contacted surface 23i (second surface) of the container main body 23 with respect to a direction crossing (preferably perpendicular to) the axes of the stirring members 43, 44 and 50 (rotatable members). The overhanging portion 26j (first overhanging portion) is provided with the contacting surface 26j2 (second opposing surface).

On the other hand, the overhanging portion 26k (second overhanging portion) is constituted in a flat plate shape which overlaps with a contacted surface 22k (third surface) of the bottom member 22 (frame) with respect to the direction crossing (preferably perpendicular to) the axes of the stirring members, 43, 44 and 50 (rotatable members). The overhanging portion 26k (second overhanging portion) is provided with a contacting surface 26k2 (third opposing surface).

The side cover 26 (fixed member) includes the contacting surface 26k2 (third opposing surface) opposing the contacted surface 22k (third surface) of the bottom member 22 (frame).

The contacting surface 26j2 (second opposing surface) of the overhanging portion 26j (first overhanging portion) and the contacting surface 26k2 (third opposing surface) of the overhanging portion 26k (second overhanging portion) are provided opposed to each other.

Incidentally, the contacting surface 26j2 (surface opposing surface) and the contacting surface 26k2 (third opposing surface) are not required that extended planes thereof are parallel to each other, and a constitution in which the extended planes of the second opposing surface and the third contacting surface are perpendicular to each other or cross each other at a predetermined angle may also be employed.

The overhanging portions 26j and 26k are constituted in a flat plate shape comprising a flat surface with no unevenness at front and back surfaces of the overhanging portions 26j and 26k. At least a front-side opposing surface 26j1 and the back-side opposing surface 26j2 (second opposing surface) of the overhanging portion 26j welded to the contacted surface 23i (second surface) of the container main body 23 8frame) by the ultrasonic spot welding are constituted by the flat surface.

Further, at least the front-surface opposing surface 26k1 and the back-side opposing surface 26k2 (third opposing surface) of the overhanging portion 26k welded by the ultrasonic spot welding to the contacted surface 22k (third surface) of the bottom member 22 (frame) are constituted by flat surfaces.

The contacting surface 26k2 (third opposing surface) of the side cover 26 (fixed member) opposes the contacted surface 22k (third surface) of the bottom member 22 (frame).

Figure 17:
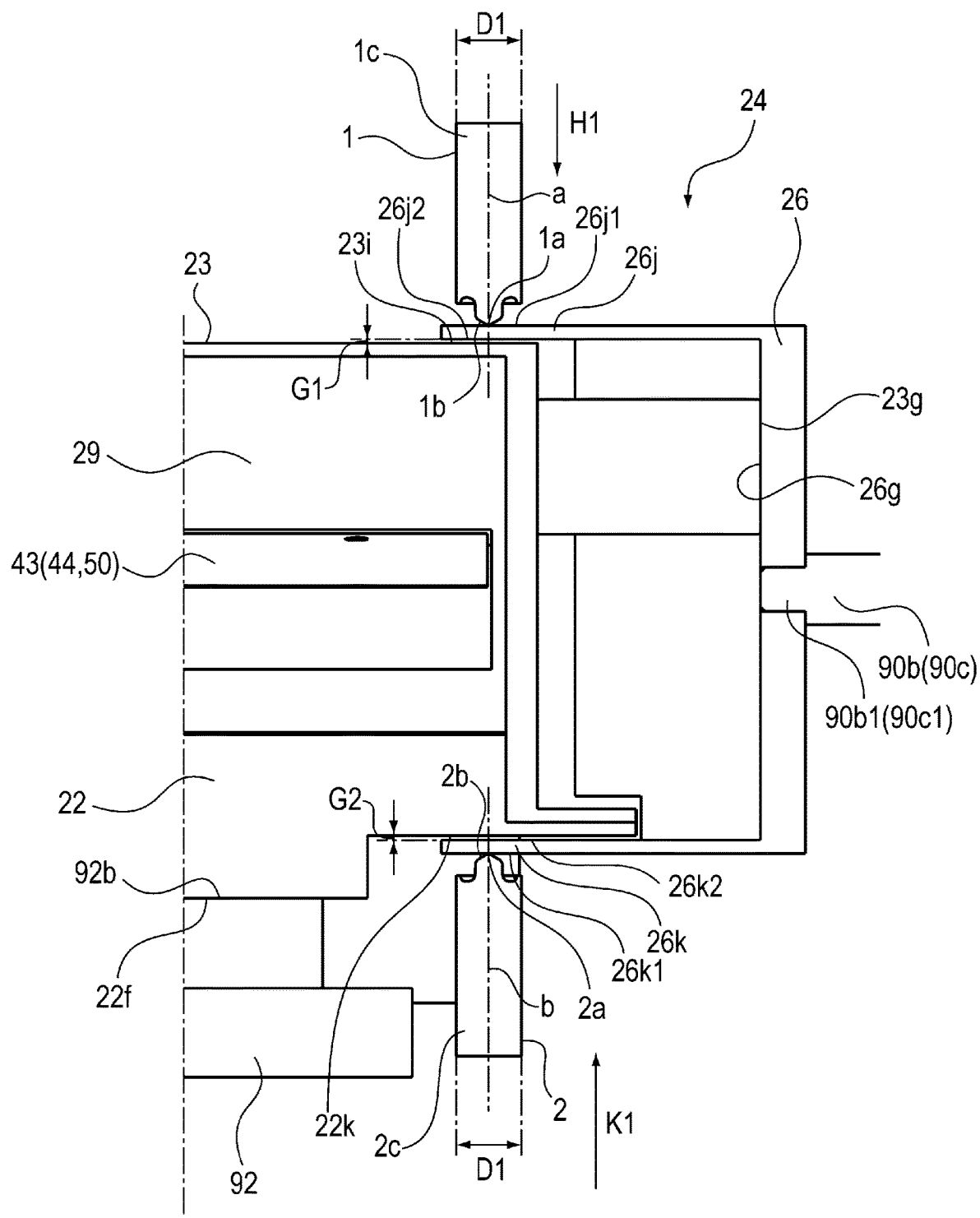
FIG. 17 is a sectional view for illustrating a bonding method among the container main body, the bottom member and the side cover of the developer container in the Second Embodiment.
Figure 18:
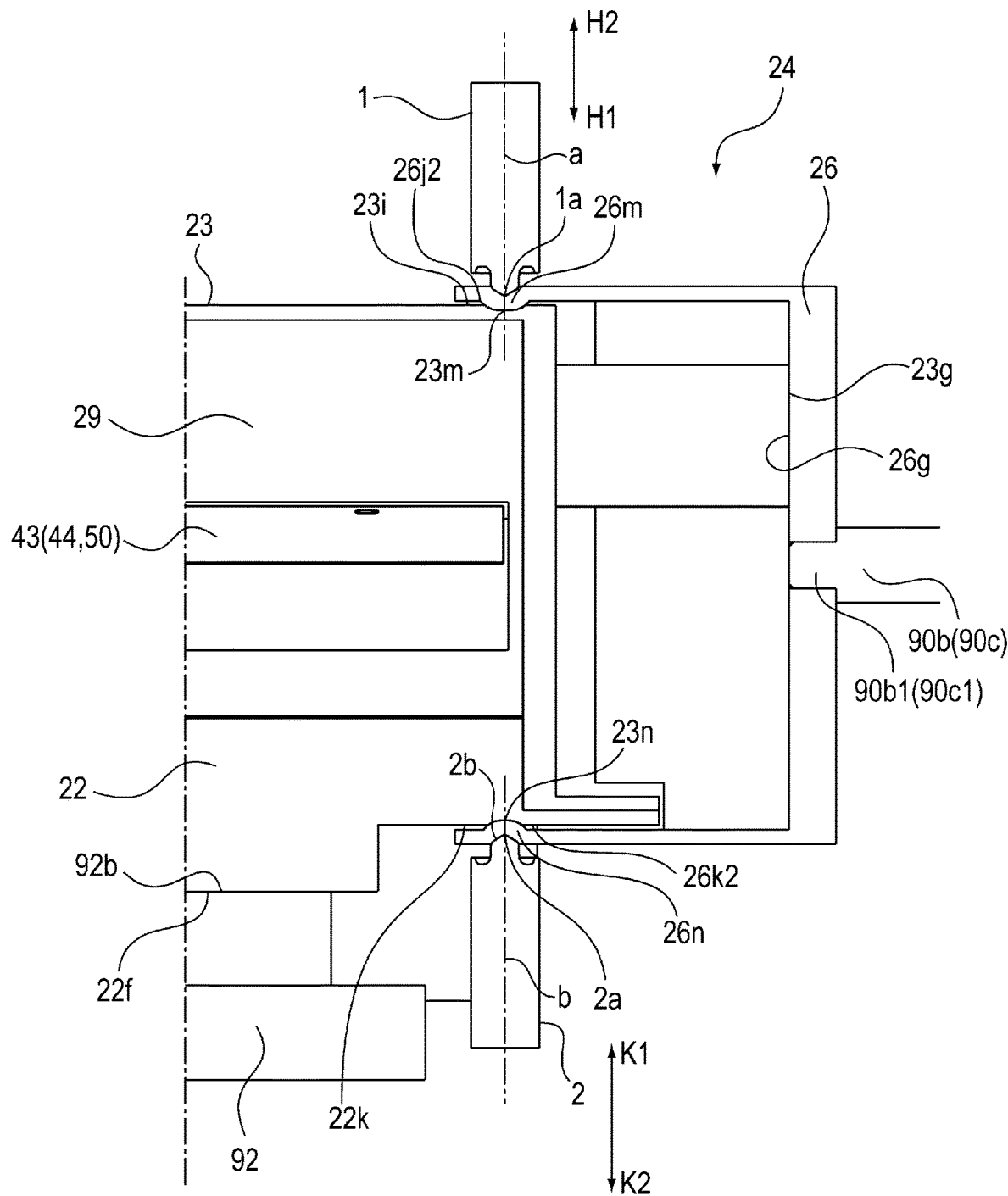
FIG. 18 is a sectional view for illustrating the bonding method among the container main body the bottom member and the side cover of the developer container in the Second Embodiment.

Here, as shown in FIGS. 17 and 18, the contacting surface 26k2 (third opposing surface), which is a surface to be welded, of the side cover 26 (fixed member) and the contacted surface 22k of the bottom member 22 will be considered.

Further, a rectilinear line b which is perpendicular to the contacting surface 26k2 (third opposing surface) and the contacted surface 22k (third surface) and which passes through welded portions (melted portions 26n and 23n) to be welded by the ultrasonic spot welding will be considered. The rectilinear line b passes through the stirring chamber 29 (accommodating portion). That is, with respect to the longitudinal direction (left-right directions of FIGS. 17 and 18)

of the bottom member 22 (frame), positions of the welded portions (melted portions 23n and 26n) and the stirring chamber 29 (accommodating portion) overlap with each other.

The contacted surface 22k (third surface) of the bottom member 22 and the contacting surface 26k2 (third opposing surface) of the side cover 26 (fixed member) are welded to each other by the ultrasonic spot welding.

<Assembling of Side cover and Frame Before Bonding>

Similarly as in the First Embodiment described above with reference to FIG. 12, the side cover 26 is held by the assembling jig 90, and the frame (the container main body 23 and the bottom member 22) is held by the assembling jig 91 and the assembling assisting jig 92. Then, the side cover 26 and the frame (the container main body 23 and the bottom member 22) are held by the assembling jigs 90 and 91 and the assembling assisting jig 92. In that state, as shown in FIG. 16, the assembling jigs 90 and 91 and the assembling assisting jig 92 are moved to positions where the contacting surface 26g of the side cover 26 contacts the contacted surface 23g of the container main body 23.

Similarly as in the First Embodiment described above, the side cover 26 held by the assembling jig 90 (first holding member) and the frame (the container main body 23 and the bottom member 22) held by the assembling jig 91 (second holding member) are moved in the first direction (arrow S and J directions of FIG. 11). Then, as shown in FIG. 16, the contacted surface 23g (first surface) of the container main body 23 (frame) and the contacting surface 26g (first opposing surface) of the side cover 26 (fixed member) are caused to be in contact with each other. As a result, positions of the side cover 26 and the frame (the container main body 23 and the bottom member 22) with respect to the axial directions of the stirring members 43, 44 and 50 (rotatable members) are determined.

At this time, the contacting surfaces 26j2 and 26k2 provided on back surface sides of the upper and lower overhanging portions 26j and 26k, respectively, of the side cover 26, the contacted surface 23i of the container main body 23 and the contacted surface 22k of the bottom member 22 in FIG. 16 overlap with each other with respect to the vertical (up-down) direction of FIG. 16.

Further, the positions of the side cover 26 (fixed member) and the frame (the container main body 23 and the bottom member 22) with respect to the vertical direction of FIG. 16 are determined by the assembling jigs 90 and 91 and the assembling assisting jig 92. At this time, a gap G1 is provided between the contacting surface 26j2 provided on the back surface side of the overhanging portion 26j of the side cover 26 on the upper side of FIG. 16 and the contacted surface 23i of the container main body 23 on the upper side of FIG. 16. On the other hand, a gap G2 is provided between the contacting surface 26k2 provided on the back surface side of the overhanging portion 26k of the side cover 26 on the lower side of FIG. 16 and the contacted surface 22k of the container main body 23 on the lower side of FIG. 16.

The side cover 26 held by the assembling jig 90 (first holding member) and the frame (the container main body 23 and the bottom member 22) held by the assembling jig 91 (second holding member) are moved in the second direction (the arrow U direction of FIG. 11). Here, the second direction (the arrow U direction of FIG. 11) is a direction perpendicular to the first direction (the arrow S and J directions of FIG. 11).

Then, the contacted surface 23i (second surface) of the container main body 23 (frame) and the contacting surface 26j2 (second opposing surface) of the side cover 26 (fixed member) are opposed to each other. Further, the contacted surface 22k (third surface) of the bottom member 22 (frame) and the contacting surface 26k2 (third opposing surface) of the side cover 26 (fixed member) are opposed to each other.

That is, at least either one of the side cover 26 (fixed member) and the frame (container main body 23 and the bottom member 22) is moved. Then, the contacted surface 23g (first surface) of the container main body 23 (frame) and the contacting surface 26g (first opposing surface) of the side cover 26 (fixed member) are caused to be in contact with each other. Further, the contacted surface 23i (second surface) of the container main body 23 (frame) and the contacting surface 26j2 (second opposing surface) of the side cover 26 (fixed member) are opposed to each other. Further, the contacted surface 22k (third surface) of the the bottom member 22 (frame) and the contacting surface 26k2 (third opposing surface) of the side cover 26 (fixed member) are opposed to each other. Such manufacturing steps are performed. As a result, assembling of the side cover 26 and the frame (the container main body 23 and the bottom member 22) before the bonding is completed.

<Bonding of Side Cover and Frame by Ultrasonic Spot Welding>

Next, a method of connecting (bonding) the side cover 26 with the frame (the container main body 23 and the bottom member 22) by the ultrasonic spot welding will be described. As shown in FIG. 17, a pair of welding horns 1 and 2 is moved toward the upper and lower overhanging portions 26j and 26k of the side cover 26 in horn entrance directions shown as arrow H1 and K1 directions, respectively, of FIG. 17.

Then, as shown in FIG. 17, horn free end portions 1a and 2a of the welding horns 1 and 2, respectively, contact the opposing surfaces 26j1 and 26k1 provided on the front surface sides of the upper and lower overhanging portions 26j and 26k, respectively, of the side cover 26. The opposing surfaces 26j1 and 26jk are positioned on sides opposite from the contacting surfaces 26j2 and 26k2, respectively, provided on the back surface sides of the respective overhanging portions 26j and 26k. Incidentally, the welding horn 2 shown in FIG. 17 includes a cylindrical portion 2c having a diameter D1 and a tapered portion 2b decreased in diameter from the cylindrical portion 2c toward a horn free end portion 2a.

That is, a first welding horn 1 for performing the ultrasonic spot welding is contacted to the side cover 26 (fixed member) from a direction crossing (preferably from an arrow H1 direction of FIG. 17 perpendicular to) the contacting surface 26j2 (second opposing surface) of the side cover 26 (fixed member).

Further, a second welding horn 2 for performing the ultrasonic spot welding is contacted to the side cover 26 (fixed member) from a direction crossing (preferably from an arrow K1 direction of FIG. 17 perpendicular to) the contacting surface 26k2 (third opposing surface) of the side cover 26 (fixed member).

At this time, the welding horns 1 and 2 apply predetermined loads in the arrow H1 and K1 directions of (horn entrance directions) of FIG. 17 to the opposing surfaces 26j1 and 26k1, respectively. In a state in which the welding horns 1 and 2 apply the predetermined loads to the opposing surface 26j1 and 26k1, the welding horns 1 and 2 are ultrasonic-vibrated.

As a result, the frictional heat generates between the horn free end portion 1a of the welding horn 1 and the opposing surface 26j1 and between the horn free end portion 2a of the welding horn 2 and the opposing surface 26k1. By this frictional heat, the opposing surfaces 26*j* and 26*k*1 provided on the front surface sides of the overhanging portions 26*j* and 26*k* of the side cover 26 are melted. Further, as shown in FIG. 18, the horn free end portions 1*a* and 2*a* of the welding horns 1 and 2 enter toward an inside of the overhanging portions 26*j* and 26*k* provided on the front surface sides of the upper and lower overhanging portions 26*j* and 26*k* of the side cover 26 in the arrow H1 and K1 directions, respectively, of FIG. 18.

The horn free end portions 1*a* and 2*a* of the welding horns 1 and 2 and the inside of the upper and lower overhanging portions 26*j* and 26*k* of the side cover 26, the contacted surfaces 26*j*2 and 26*k*2 provided on the back surface sides of the overhanging portions 26*j* and 26*k* of the side cover 26 are melted. As a result, the melted portions 26*m* and 26*n* are formed. Further, the melted portions 26*m* and 26*n* contact the contacted surface 23*i* of the container main body 23 and the contacted surface 22*k* of the bottom member 22, respectively, so that the melted portions 23*m* and 23*n* are formed by frictional heat between the melted portion 26*m* and the contacted surface 23*i* and frictional heat between the melted portion 26*n* and the contacted surface 22*k*, respectively.

Thereafter, the welding horns 1 and 2 are retracted in arrow H2 and K2 directions, respectively, of FIG. 18, and the respective melted portions 26*m*, 26*n*, 23*m* and 23*n* are cooled and solidified. That is, by the frictional heat due to the ultrasonic spot welding of the first and second welding horns 1 and 2, the contacting surface 26*j*2 (second opposing surface) of the side cover 26 (fixed member) and the contacted surface 23*i* (second surface) of the container main body 23 (frame) are melted. Further, the contacting surface 26*k*2 (third opposing surface) of the side cover 26 (fixed member) and the contacted surface 22*k* (third surface) of the bottom member 22 (frame) are melted. Thereafter, these surfaces are cooled and solidified.

As a result, the upper and lower overhanging portions 26*j* and 26*k* of the side cover 26, the container main body 23 and the bottom member 22 are in a state in which the respective melted portions 26*m*, 26*n*, 23*m* and 23*n* which are solidified are integrally bonded to each other. That is a manufacturing step of bonding the frame (the container main body 23 and the bottom member 22) and the side cover 26 by the ultrasonic spot welding is performed.

At this time, as shown in FIG. 18, the contacted surface 23*g* (first surface) of the container main body 23 (frame) and the contacting surface 26*g* (first opposing surface) of the side cover 26 (fixed member) are in contact with each other. In that state, the contacted surface 23*i* (second surface) of the container main body 23 (frame) and the contacting surface 26*j*2 (second opposing surface) of the side cover 26 (fixed member) are welded by the ultrasonic spot welding. Further, the contacted surface 22*k* (third surface) of the bottom member 22 (accommodating portion) and the contacting surface 26*k*2 (third opposing surface) of the side cover 26 (fixed member) are welded by the ultrasonic spot welding.

In the First Embodiment, at an assembling completion position of the side cover 26 and the container main body 23 before the bonding shown in FIG. 12, the contacting surface 26*j*2 on the front surface side of the upper overhanging portion 26*j* of the side cover 26 and the contacted surface 2*i* of the container main body 23 were contacted to each other. The assembling completion position of the side cover 26 and the bottom member 22 before the bonding shown in FIG. 16 will be considered. The case where at that position, the contacting surfaces 26*j*2 and 26*k*2 on the front surface sides of the upper and lower overhanging portions 26*j* and 26*k* of the side cover 26, and the contacted surface 23*i* of the container main body 23 and the contacted surface 22*k* of the bottom member 22 are contacted to each other will be considered.

In that case, a tolerance between the two component parts comprising the side cover 26 and the frame (the container main body 23 and the bottom member 22) will be considered. Then, there is a liability that the upper and lower overhanging portions 26*j* and 26*k* of the side cover 26 and the frame (the container main body 23 and the bottom member 22) interfere with each other during the assembling of the side cover 26 and the frame (the container main body 23 and the bottom member 22) before the bonding shown in FIG. 16.

In this embodiment, the time of the assembling of the side cover 26 and the frame (the container main body 23 and the bottom member 22) before the bonding shown in FIG. 16 will be considered. At that time, positions of the upper and lower overhanging portions 26*j* and 26*k* of the side cover 26 with respect to the vertical (up-down) direction of FIG. 16 are determined by the assembling jigs 90 and 91 and the assembling assisting jig 92. In that case, between the contacting surface 26*j*2 on the back surface side of the upper overhanging portion 26*j* of the side cover 26 and the contacted surface 23*i* of the container main body 23 and between the contacting surface 26*k*2 on the back surface side of the lower overhanging portion 26*k* of the side cover 26 and the contacted surface 22*k* of the bottom member 22, the gaps G1 and G2 are provided, respectively.

Even in a state in which the gaps G1 and G2 exist, the upper and lower overhanging portions 26*j* and 26*k* of the side cover 26 and the frame (the container main body 23 and the bottom member 22) can be bonded to each other by the ultrasonic spot welding. Accordingly, at upper and lower portions of the frame (the container main body 23 and the bottom member 22), the ultrasonic spot welding can be carried out at a plurality of positions along a widthwise direction of the frame (the container main body 23 and the bottom member 22) perpendicular to the axial directions of the stirring members 43, 44 and 50 (rotatable members). For this reason, bonding strength further higher than that in the First Embodiment can be obtained.

Incidentally, in this embodiment, the bonding of the frame (the container main body 23 and the bottom member 22) and the side cover 26 which are provided in the developing unit 20 was described, but the present invention is also applicable to bonding of the cleaning frame 71 and the drum bearing 73 which are provided in the cleaning unit 60, for example. Further, the present invention is also applicable to bonding of other frames, bearings, covers, and the like. In this case, a constitution in which a rotatable member is rotatably supported by at least either one of the frame and the fixed member may also be employed.

For example, as an example of the rotatable member for feeding the toner T, it is possible to cite the stirring members 43, 44 and 50. In this embodiment, the stirring members 43, 44 and 50 are rotatably supported by the container main body 23. Further, the side cover 26 as the fixed member is fixed to the container main body 23 by the ultrasonic spot welding. In this case, the container main body 23 is the frame.

Further, as an example of the rotatable member for feeding the toner T, it is possible to cite the developing roller 32. In this embodiment, the developing roller 32 is rotatably supported by the bearing members 27 and 37. Further, the side cover 26 as the fixed member is fixed to the container main body 23 by the ultrasonic spot welding. In this case, a portion including at least the container main body 23 and the bearing members 27 and 37 is the frame.

On the other hand, the bearing members 27 and 37 may also be fixed to the container main body 23 by the ultrasonic spot welding. That is, in this case, the container main body 23 is the frame, and the bearing members 27 and 37 are the fixed members.

Further, as an example of the rotatable member for feeding the toner T, it is possible to cite the photosensitive drum 62. In this embodiment, as shown in FIG. 5, on the non-driving side, the photosensitive drum 62 is supported by the cleaning frame 71 via the drum shaft 78. On the driving side, the photosensitive drum 62 is rotatably supported by the drum bearing 73. At this time, the drum bearing 73 may also be fixed to the cleaning frame 71 by the ultrasonic spot welding. That is, in this case, the cleaning frame 71 is the frame, and the drum bearing 73 is the fixed member. As the bonding (connecting) methods of the frames with the fixed members, it is possible to use methods similar to those described in the respective embodiments.

Further, the present invention is also applicable to bonding at a periphery of a portion, such as the boss 73c or the like of the drum bearing 73, where a force of the urging member 46R acts and where there is a liability of an occurrence of deformation. Other constitutions are similar to those in the First Embodiment described above, and a similar effect can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-072822 filed on Apr. 5, 2018, which is hereby incorporated by reference herein in its entirety.

What is claimed is:

1. A supporting unit for supporting a rotatable member configured to feed a developer, said supporting unit comprising:
    a frame including a first surface extending in a direction crossing an axis of the rotatable member and a second surface extending in a direction crossing said first surface; and
    a fixed member including (i) a first opposing surface opposing and contacting said first surface, (ii) a second opposing surface opposing said second surface, and (iii) a first front side surface opposite from said second opposing surface,
    wherein said second opposing surface is welded to said second surface by ultrasonic spot welding such that a first recess is formed on said first front side surface.

2. A supporting unit according to claim 1, wherein said fixed member includes a projected portion overlapping with said second surface and having a plate shape, and said projected portion includes said second opposing surface.

3. A supporting unit according to claim 1, wherein said frame includes a third surface extending in a direction crossing said first surface,
    wherein said fixed member includes a third opposing surface opposing said third surface and a second front side surface opposite from said third opposing surface, and
    wherein said third surface and said third opposing surface are welded to each other by the ultrasonic spot welding such that a second recess is formed on said second front side surface.

4. A supporting unit according to claim 3, wherein said fixed member includes,
    a first projected portion overlapping with said second surface and having a plate shape, and
    a second projected portion overlapping with said third surface and having a plate shape, and
    wherein said first projected portion includes said second opposing surface, and said second projected portion includes said third opposing surface.

5. A supporting unit according to claim 4, wherein said second opposing surface and said third opposing surface are provided opposed to each other.

6. A supporting unit according to claim 3, wherein said first surface is away from said third surface.

7. A supporting unit according to claim 1, wherein a material of said frame and a material of said fixed member have compatibility with each other.

8. A supporting unit according to claim 1, wherein said frame includes an accommodating portion configured to accommodate the developer, and
    wherein when a rectilinear line which is perpendicular to said second opposing surface and said second surface and which passes through a welding portion to be welded by the ultrasonic spot welding is drawn, said rectilinear line passes through said accommodating portion.

9. A developer container comprising:
    a supporting unit according to claim 1; and
    a rotatable member,
    wherein said frame includes an accommodating portion configured to accommodate the developer, and said rotatable member is a stirring member configured to stir the developer accommodated in said accommodating portion.

10. A developing device comprising:
    a supporting unit according to claim 1; and
    a rotatable member,
    wherein said rotatable member is a developer carrying member configured to supply the developer to an image bearing member.

11. A photosensitive member unit comprising:
    a supporting unit according to claim 1; and
    a rotatable member,
    wherein said rotatable member is a an image bearing member configured to bear an electrostatic latent image.

12. A process cartridge comprising:
    a developer bearing member;
    a supporting unit according to claim 1; and
    a rotatable member,
    wherein said rotatable member is an image bearing member configured to bear an electrostatic latent image, and
    wherein said developer bearing member is configured to supply the developer to said image bearing member.

13. A supporting unit according to claim 1, wherein said first surface is away from said second surface.

14. A method of manufacturing a supporting unit for supporting a rotatable member configured to feed a developer, wherein the supporting unit includes a frame and a fixed member, the frame including a first surface extending in a direction crossing an axis of the rotatable member and a second surface extending in a direction crossing the first surface, and the fixed member including (i) a first opposing surface configured to oppose the first surface, (ii) a second opposing surface configured to oppose the second surface, and (iii) a first front side surface opposite from said second opposing surface, said manufacturing method comprising:

a step of causing the first surface and the first opposing surface to contact each other and causing the second surface and the second opposing surface to oppose each other by moving at least either one of the fixed member and the frame; and a step of connecting the frame and the fixed member with each other by causing a welding horn for performing ultrasonic spot welding to contact the fixed member from a direction crossing the second opposing surface of the fixed member so as to melt the second opposing surface and the second surface of the frame and to form a first recess on said first front side surface.

15. A manufacturing method of a supporting unit according to claim 14, wherein the frame includes a third surface extending in a direction crossing the first surface, and the fixed member includes a third opposing surface opposing the third surface, and a second front side surface opposite from said third opposing surface, and wherein said manufacturing method comprises, a step of causing the first surface and the first opposing surface to contact each other and causing the third surface and the third opposing surface to oppose each other by moving at least either one of the fixed member and the frame; and a step of connecting the frame and the fixed member with each other by causing a second welding horn for performing ultrasonic spot welding to contact the fixed member from a direction crossing the third opposing surface of the fixed member so as to melt the third opposing surface and the third surface of the frame and to form a second recess on said second front side surface.

16. A manufacturing method of a supporting unit according to claim 15, wherein said first surface is away from said third surface.

17. A manufacturing method of a supporting unit according to claim 14, wherein said first surface is away from said second surface.

* * * * *